(12) United States Patent
Zhang et al.

(10) Patent No.: US 12,261,542 B2
(45) Date of Patent: Mar. 25, 2025

(54) CONTROL METHOD FOR DUAL ACTIVE BRIDGE CIRCUIT

(71) Applicant: Infineon Technologies Austria AG, Villach (AT)

(72) Inventors: Yi Zhang, Shenzhen (CN); Cheng Zhang, Shenzhen (CN); Sanbao Shi, Shenzhen (CN)

(73) Assignee: Infineon Technologies Austria AG, Villach (AT)

( * ) Notice: Subject to any disclaimer, the term of this patent is extended or adjusted under 35 U.S.C. 154(b) by 174 days.

(21) Appl. No.: 18/296,920

(22) Filed: Apr. 6, 2023

(65) Prior Publication Data

US 2024/0339934 A1   Oct. 10, 2024

(51) Int. Cl.
*H02M 3/335* (2006.01)
*H02M 1/00* (2006.01)
*H02M 3/158* (2006.01)

(52) U.S. Cl.
CPC ..... *H02M 3/33592* (2013.01); *H02M 1/0064* (2021.05); *H02M 3/33584* (2013.01); *H02M 3/158* (2013.01)

(58) Field of Classification Search
CPC .......................... H02M 3/158; H02M 3/33592
See application file for complete search history.

(56) References Cited

U.S. PATENT DOCUMENTS

| 10,389,275 B2* | 8/2019 | Notsch ............. H02M 3/33592 |
| 11,075,582 B2* | 7/2021 | Escudero Rodriguez ................... H02M 1/32 |
| 2019/0028035 A1* | 1/2019 | Choi ....................... H02M 3/01 |
| 2022/0103082 A1* | 3/2022 | Yang ................ H02M 3/33592 |

OTHER PUBLICATIONS

"Bidirectional, Dual Active Bridge Reference Design for Level 3 Electric Vehicle Charging Stations," Texas Instruments, Design Guide: TIDA-010054, TIDUES0C, Jul. 2022, 86 pages.

* cited by examiner

Primary Examiner — Gary A Nash
(74) Attorney, Agent, or Firm — Harrity & Harrity, LLP

(57) ABSTRACT

A dual active bridge circuit includes a primary side circuit including first high-side transistor and a first low-side transistor electrically coupled at a first node, and an energy transfer inductor coupled to the first node and configured to provide an inductor current based on a voltage differential across the energy transfer inductor. A secondary side circuit includes a second high-side transistor and a second low-side transistor electrically coupled at a second node. A transformer is configured to transfer energy from the primary side circuit to the secondary side circuit based on the inductor current. A controller is configured to drive each of the transistors between respective switching states with a same duty cycle to control the voltage differential across the energy transfer inductor. The same duty cycle is less than 50% such that all of the transistors are simultaneously off for a predetermined interval.

28 Claims, 7 Drawing Sheets

CONTROL METHOD FOR DUAL ACTIVE BRIDGE CIRCUIT

BACKGROUND

Many functions of modern devices in automotive, consumer, and industrial applications, such as driving an electric motor or an electric machine, rely on power semiconductor devices. For example, Insulated Gate Bipolar Transistors (IGBTs), Metal Oxide Semiconductor Field Effect Transistors (MOSFETs), and diodes, to name a few, have been used for various applications including, but not limited to, switches in power supplies and power converters.

A transistor typically comprises a semiconductor structure configured to conduct a load current along a load current path between two load terminal structures of the transistor. In other words, the load current flows through a semiconductor channel of the transistor. Further, the load current may be controlled by a control electrode, sometimes referred to as a gate electrode, of the transistor. The control electrode controls a state of the semiconductor channel. For example, upon receiving a corresponding control signal from, for example, a gate driver, the control electrode may set its transistor in one of a conducting state or a blocking state. Accordingly, the semiconductor structure behaves like a switch with on and off states (e.g., conducting and blocking states, respectively).

Usually, a power inverter is composed of two complementary transistors (e.g., a high-side transistor and a low-side transistor) for each load phase, where the two complementary transistors form a half-bridge to drive an output pad connected to a load. A gate driver, used for driving the two complementary transistors, may be supplied with a fixed positive voltage by a positive supply rail and a fixed negative voltage by a negative supply rail. The positive supply rail may be connected to the output pad via the high-side transistor of the two complementary transistors to supply load current to the load, and the negative supply rail may be connected to the output pad via the low-side transistor of the two complementary transistors to sink load current from the load. The two complementary transistors may be complementarily turned on and off to avoid cross-conduction.

Accordingly, the load current, also referred to as a phase current, may be controlled by driving the two complementary transistors. The amplitude of the control signal received from the gate driver for each transistor may be varied to drive the two complementary transistors between switching states. Doing so, in turn, drives the load. For example, a gate-source voltage Vgs of a MOSFET is typically driven down to approximately zero to turn off the MOSFET and is typically driven to a maximum value to fully turn on the MOSFET. For this reason, the gate-source voltage Vgs may be referred to as a control voltage.

During a running operation, a load may be driven according to a load control algorithm to achieve a desired performance corresponding to an electrical frequency of the control signals.

SUMMARY

In some implementations, a dual active bridge circuit includes a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, wherein the transformer comprises: a first coil electrically coupled to the energy transfer inductor for receiving the inductor current and a second coil electrically coupled to the second node of the second half-bridge, wherein the first coil is magnetically coupled to the second coil; and a controller configured to drive each of the first high-side transistor, the first low-side transistor, the second high-side transistor, and the second low-side transistor between respective switching states with a same duty cycle to control the voltage differential across the energy transfer inductor, wherein the controller is configured to drive the first high-side transistor 180° out-of-phase with respect to the first low-side transistor, wherein the controller is configured to drive the second high-side transistor 180° out-of-phase with respect to the second low-side transistor wherein the same duty cycle is less than 50% such that the first high-side transistor, the first low-side transistor, the second high-side transistor, and the second low-side transistor are simultaneously off for a predetermined interval.

In some implementations, a dual active bridge circuit includes a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, wherein the transformer comprises: a first coil electrically coupled to the energy transfer inductor for receiving the inductor current and a second coil electrically coupled to the second node of the second half-bridge, wherein the first coil is magnetically coupled to the second coil; and a controller configured to drive each of the first high-side transistor, the first low-side transistor, the second high-side transistor, and the second low-side transistor between respective switching states to control the voltage differential across the energy transfer inductor, wherein the controller is configured to drive the first high-side transistor and the first low-side transistor in a complementary manner, wherein the controller is configured to drive the second high-side transistor and the second low-side transistor in a complementary manner, wherein the controller is configured to drive the first high-side transistor and the second high-side transistor with a same duty cycle that is different than 50%, wherein the controller is configured to drive the second high-side transistor with a first phase shift relative to the first high-side transistor, the first phase shift being different than zero, wherein the controller is configured to drive the first half-bridge and the second half-bridge in order to drive the voltage differential across the energy transfer inductor to zero and maintain the voltage differential across the energy transfer inductor at zero for a predetermined interval causing the inductor current to be clipped at a reduced current level, and wherein the controller is configured to turn on the first high-side transistor or turn on the first low-side transistor when the inductor current is equal to or substantially equal to the reduced current level.

In some implementations, a method of driving a dual active bridge circuit comprising a primary side circuit configured to be coupled to a power source for receiving an input voltage includes driving each of the first high-side transistor, the first low-side transistor, the second high-side transistor, and the second low-side transistor between respective switching states with a same duty cycle to control the voltage differential across the energy transfer inductor; driving the first high-side transistor 180° out-of-phase with respect to the first low-side transistor; and driving the second high-side transistor 180° out-of-phase with respect to the second low-side transistor, wherein the same duty cycle is less than 50% such that the first high-side transistor, the first low-side transistor, the second high-side transistor, and the second low-side transistor are simultaneously off for a predetermined interval.

In some implementations, a method of driving a dual active bridge circuit comprising a primary side circuit configured to be coupled to a power source for receiving an input voltage includes driving each of the first high-side transistor, the first low-side transistor, the second high-side transistor, and the second low-side transistor between respective switching states to control the voltage differential across the energy transfer inductor; driving the first high-side transistor and the first low-side transistor in a complementary manner; driving the second high-side transistor and the second low-side transistor in a complementary manner; driving the first high-side transistor and the second high-side transistor with a same duty cycle that is different than 50%; driving the second high-side transistor with a first phase shift relative to the first high-side transistor, the first phase shift being different than zero; driving the first half-bridge and the second half-bridge in order to drive the voltage differential across the energy transfer inductor to zero and maintain the voltage differential across the energy transfer inductor at zero for a predetermined interval causing the inductor current to be clipped at a reduced current level; and turning on the first high-side transistor or turning on the first low-side transistor when the inductor current is equal to or substantially equal to the reduced current level.

BRIEF DESCRIPTION OF THE DRAWINGS

Implementations are described herein making reference to the appended drawings.

DETAILED DESCRIPTION

Figure 1:
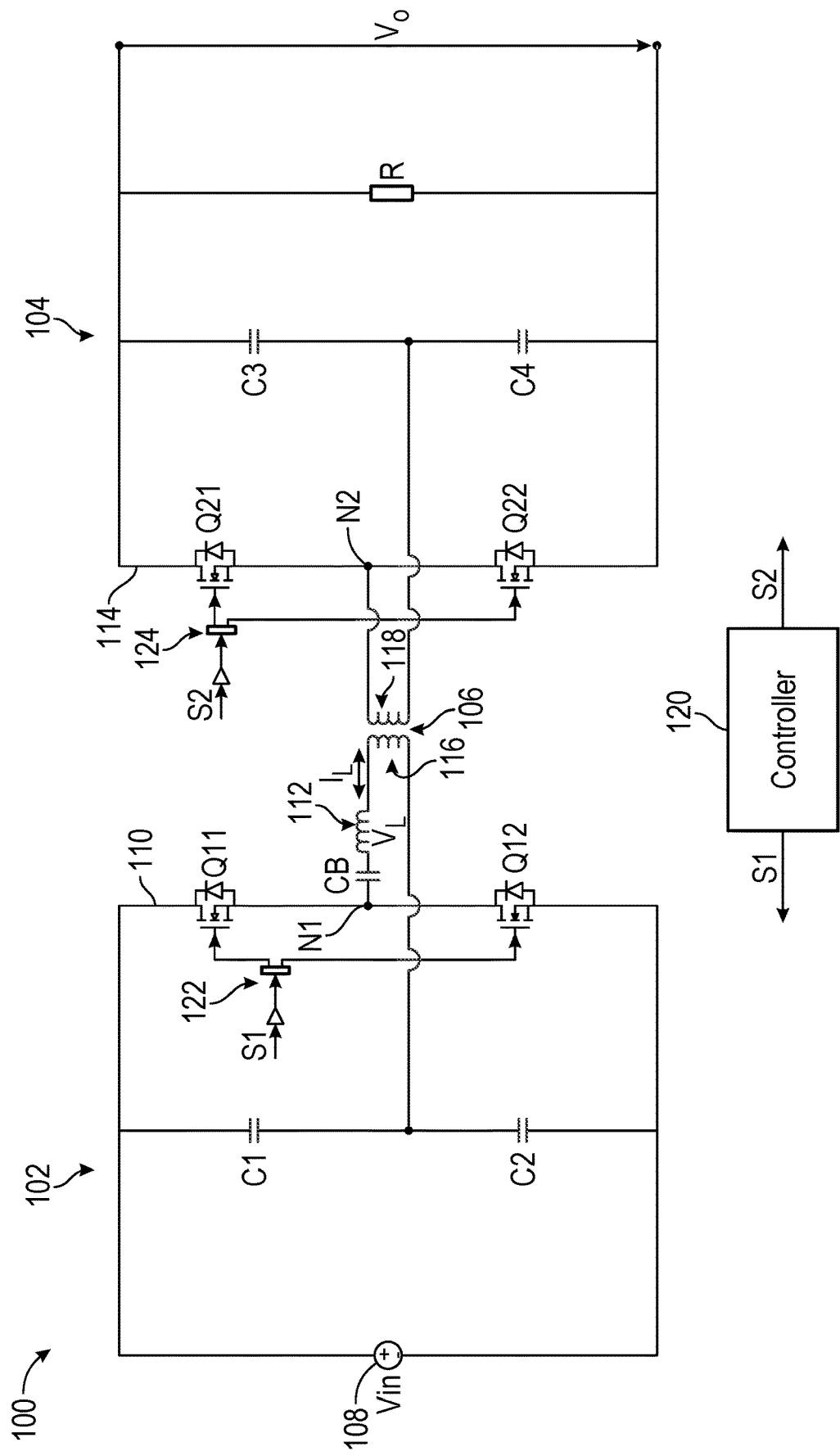
FIG. 1 illustrates a schematic diagram of a dual active bridge (DAB) circuit according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained.

Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A transistor can be referred to as a power switch, a logic switch, or a transistor switch that may be used to drive a current, such as a load current. In particular, a power transistor is a power semiconductor device that may be used to drive a load current. The power transistor includes a first load terminal (e.g., a source or an emitter) and a second load terminal (e.g., a drain or a collector). Additionally, a load current path of the power transistor may be controlled by a control electrode, sometimes referred to as a gate, connected to a control terminal of the power transistor. A load current path of the power transistor is a gate-controlled conductive channel whose conductivity may be controlled by a control voltage applied to the control electrode of the power transistor. For example, the power transistor can be turned "on" or "off" by activating and deactivating its control electrode. For example, applying a positive voltage across a gate and a source of a metal oxide semiconductor field effect transistor (MOSFET) will keep the MOSFET in its "on" state, while applying a voltage of approximately zero or slightly negative across the gate and the source of the MOSFET will cause the MOSFET to turn "off."

There is a turn-on process and a turn-off process for switching a transistor on and off. During the turn-on process of an n-channel transistor, a gate driver may be used to provide (e.g., source) a gate current (e.g., an ON current) to a gate of the n-channel transistor in order to charge a gate voltage to a sufficient voltage to turn on the n-channel transistor. In contrast, during the turn-off process of the n-channel transistor, the gate driver is used to draw (e.g., sink) a gate current (e.g., an OFF current) from the gate of the n-channel transistor in order to discharge the gate voltage sufficiently to turn off the n-channel transistor. A voltage pulse may be output from the gate driver as a control signal according to a pulse-width modulation (PWM) scheme. Thus, the control signal may be switched between an ON voltage level and an OFF voltage level during a PWM cycle for controlling the n-channel transistor. This in turn charges and discharges the gate voltage to turn on and turn off the n-channel transistor, respectively.

The opposite is true for a p-channel transistor. The gate driver may be used to draw (e.g., sink) a gate current (e.g., an ON current) from a gate of the p-channel transistor in order to discharge the gate voltage to a sufficient voltage to turn on the p-channel transistor. In contrast, during the turn-off process of the p-channel transistor, the gate driver is used to provide (e.g., source) a gate current (e.g., an OFF current) to the gate of the p-channel transistor in order to charge the gate voltage of the p-channel transistor sufficiently to turn off the p-channel transistor. A control signal applied to the gate of the p-channel transistor may be switched between an ON voltage level and an OFF voltage level during a PWM cycle for controlling the p-channel transistor. This in turn charges and discharges the gate voltage to turn on and turn off the p-channel transistor, respectively.

For both n-channel and p-channel transistors, the n-channel and p-channel transistors are off when the gate-source voltage Vgs is approximately a zero value or below a threshold voltage and the n-channel and p-channel transistors are on when the gate-source voltage Vgs is equal to or greater than the threshold voltage.

For driving a load in this manner, two transistors are typically arranged in a half-bridge configuration, including a high-side transistor and a low-side transistor. The high-side transistor may be a p-channel transistor connected to a high-side supply potential and the low-side transistor may be an n-channel transistor connected to a low-side supply potential. In some implementations, the high-side transistor and the low-side transistor may be of a same transistor type (e.g., both n-channel type or both p-channel type).

A load current is said to be a positive load current when the load current is flowing from a half-bridge toward the load, and a load current is said to be negative when the load current is flowing away from the load toward the half-bridge. A high-side transistor, when on, is responsible for conducting a positive load current in order to source the load current to the load while the high-side transistor's complementary, low-side transistor is turned off (e.g., the low-side transistor is in blocking or high impedance mode). In order to sink load current from the load, the roles of the high-side and low-side transistors are reversed. Here, the low-side transistor, when on, is responsible for conducting a negative load current in order to sink the load current from the load while the low-side transistor's complementary, high-side transistor is turned off (e.g., the high-side transistor is in blocking or high impedance mode). The two complementary transistors are typically switched such that both are not turned on at the same time.

Transistors may include insulated gate bipolar transistors (IGBTs) and MOSFETs (e.g., Si MOSFETs or SiC MOSFETs), among other examples. One type of transistor may be substituted for another type of transistor. In this context, when a MOSFET is substituted for an IGBT, the MOSFET's drain may be substituted for the IGBT's collector, the MOSFET's source may be substituted for the IGBT's emitter, the MOSFETs drain-source voltage Vds may be substituted for the IGBT's collector-emitter voltage Vce, and the MOSFET's gate-source voltage Vgs may be substituted for the IGBT's gate-emitter voltage Vge, or vice versa, in any one of the examples described herein.

Some implementations described in this disclosure pertain to, without being limited to, half-bridges arranged in a dual active bridge (DAB) topology. The half-bridges are arranged to form a DAB converter. The DAB converter is a bidirectional DC-DC converter with similar primary side and secondary side bridge topologies. The DAB converter further includes a high frequency transformer and an energy transfer inductor. The inductance of the energy transfer inductor may represent leakage inductance of the transformer plus any external energy transfer inductance. Control signals are applied to the half-bridges in a manner to generate a voltage differential across the energy transfer inductance and direct the stored energy of the energy transfer inductance. In other words, the control signals are applied to the half-bridges in order to control a power flow across the transformer between the primary side and secondary side of the DAB converter. In some cases, the power flow in the DAB converter may be directed by phase-shifting the control signals of one side of the DAB converter with respect to the control signals of the other side of the DAB converter using phase shift modulation. The control signals may direct power to the transformer such that the leading side of the DAB converter delivers power to the lagging side of the DAB converter. In some instances, the phase shift between the primary side and the secondary side may be zero and still be capable of delivering power, for example, from the primary side to the secondary side.

The DAB converter may be operated in a low-voltage output mode or a high-voltage output mode. In the low-voltage output mode, an input voltage Vin of the DAB converter is greater than a product of the output voltage Vo of the DAB converter and a transformer turn ratio n of the transformer (e.g., Vin>Vo×n). In the high-voltage output mode, the input voltage Vin of the DAB converter is less than a product of the output voltage Vo and the transformer turn ration of the transformer (e.g., Vo×n>Vin).

When a traditional phase-shift method is used in a DAB topology, the switching loss and conduction loss at low-voltage output are very high. Junction temperatures are also very high. As a result of the high switching loss and the high conduction loss, the delivery of power to the load is inefficient. In some cases, one or more transistors may fail due to the high loss, even when operating at light load. Furthermore, the DAB converter may not be capable of providing the desired low-voltage output due to the losses. Some traditional methods utilize an internal phase shift and outer phase shift, called a multi-phase shift, to reduce losses. However, the control logic for a multi-phase shift method is complex and increases costs. In addition, the multi-phase shift method may be used for 3-phase DAB topologies, but the control logic to implement the multi-phase shift method would be complex.

Similarly, for the traditional phase-shift method in a DAB topology, the switching loss and conduction loss at high-voltage output is very high. Junction temperatures are also very high. As a result of the high switching loss and the high conduction loss, the delivery of power to the load is inefficient. Furthermore, the DAB converter may not be capable of providing the desired high-voltage output due to the losses.

Some implementations disclosed herein are directed to a DAB circuit operated in low-voltage output mode that uses a symmetric PWM switching algorithm to reduce switching losses and/or conduction losses. For example, the symmetric PWM switching algorithm may be configured to reduce the load currents of the transistors of the secondary side at the time the transistors of the secondary side are turned on to reduce the switching losses and/or the conduction losses of the transistors of the secondary side. As a result, the efficiency of the DAB circuit can be improved while the DAB circuit is operated in the low-voltage output mode. Furthermore, the symmetric PWM switching algorithm may extend a lower limit of the output voltage range, and can be applied in any DAB topology, including half-bridge topologies, full-bridge topologies, 3-phase topologies, or 4 or more phase topologies.

Some implementations disclosed herein are directed to a DAB circuit operated in high-voltage output mode that uses a complementary PWM switching algorithm with an outer phase shift to reduce switching losses and/or conduction losses. For example, the complementary PWM switching algorithm with an outer phase shift may be configured to reduce the load currents of the transistors of the primary side at the time the transistors of the primary side are turned on, to reduce the switching losses and/or the conduction losses of the transistors of the primary side. As a result, the efficiency of the DAB circuit can be improved while the DAB circuit is operated in the high-voltage output mode. Furthermore, the complementary PWM switching algorithm with an outer phase shift may extend an upper limit of the output voltage range, and can be applied in any DAB topology, including half-bridge topologies, full-bridge topologies, 3-phase topologies, or 4 or more phase topologies.

FIG. 1 illustrates a schematic diagram of a DAB circuit 100 according to one or more implementations. For example, the DAB circuit 100 may be a DAB converter that includes a primary side circuit 102, a secondary side circuit 104, and a transformer 106 that is configured to transfer energy between the primary side circuit 102 and the secondary side circuit 104 while providing galvanic isolation between the primary side circuit 102 and the secondary side circuit 104.

The DAB circuit 100 may be a half-bridge DAB that includes a single half-bridge on the primary side and another single half-bridge on the secondary side. The primary side circuit 102 may be configured to be coupled to a DC power source 108 for receiving an input voltage Vin from the DC power source 108. In addition, the primary side circuit 102 may include a first half-bridge 110 comprising a first high-side transistor Q11 and a first low-side transistor Q12 electrically coupled at a first node N1. The primary side circuit 102 may further include bridge capacitors C1 and C2 that divide the input voltage Vin to produce a constant mid-point voltage. For example, the bridge capacitors C1 and C2 may be used to produce the constant mid-point voltage at half the input voltage Vin across a primary winding of the transformer 106. The primary side circuit 102 may further include an energy transfer inductor 112 coupled to the first node N1 and configured to provide an inductor current $I_L$ based on a voltage differential $V_L$ across the energy transfer inductor 112. The primary side circuit 102 may further include a blocking capacitor CB that is connected between the first node N1 and the energy transfer inductor 112 to eliminate a DC bias part of the inductor current $I_L$ and to prevent saturation of the energy transfer inductor 112 and the transformer 106. In particular, the blocking capacitor CB may be used to eliminate DC current bias when energy is transferred from the primary side circuit 102 to the secondary side circuit 104.

The secondary side circuit 104 may be configured to provide an output voltage Vo to a load. The output voltage Vo may be represented by a voltage drop across a resistor R. The secondary side circuit 104 may include a second half-bridge 114 comprising a second high-side transistor Q21 and a second low-side transistor Q22 electrically coupled at a second node N2. The secondary side circuit 104 may further include bridge capacitors C3 and C4 used to produce the output voltage Vo based on a voltage across a secondary winding of the transformer 106. The bridge capacitors C3 and C4 may also be configured to smooth the output voltage Vo by reducing ripple. Similar to the use of the blocking capacitor CB of the primary side circuit 102, a blocking capacitor may be added to the secondary side circuit 104 (e.g., coupled to and between the second coil 118 and the second node N2) in order to eliminate DC current bias when energy is transferred from the second side circuit 104 to the primary side circuit 102.

The transformer 106 may be configured to transfer energy from the primary side circuit 102 to the secondary side circuit 104 based on the inductor current $I_L$. The transformer 106 includes a first coil 116 (e.g., a primary winding) electrically coupled to the energy transfer inductor 112 for receiving the inductor current $I_L$ and a second coil 118 (e.g., a secondary winding) electrically coupled to the second node N2 of the second half-bridge 114. The first coil 116 is magnetically coupled to the second coil 118 to enable the energy transfer.

The DAB circuit 100 further includes a controller 120 configured to drive each of the first high-side transistor Q11, the first low-side transistor Q12, the second high-side transistor Q21, and the second low-side transistor Q22 between respective switching states according to a switching control algorithm to control the voltage differential $V_L$ across the energy transfer inductor 112. As a result, the controller 120 also controls the inductor current $I_L$ and the energy transfer between the primary side circuit 102 and the secondary side circuit 104. For example, the controller 120 may generate control signals S1 and S2 that are applied to the half-bridges 110 and 114 in a manner to generate the voltage differential $V_L$ across the energy transfer inductor 112 and direct the stored energy of the energy transfer inductor 112. The DAB circuit 100 may include a first driver circuit 122 that is configured to receive the control signal S1 and control the respective switching states of the first high-side transistor Q11 and the first low-side transistor Q12 based on the control signal S1. The DAB circuit 100 may also include a second driver circuit 124 that is configured to receive the control signal S2 and control the respective switching states of the second high-side transistor Q21 and the second low-side transistor Q22 based on the control signal S2.

The DAB circuit 100 may be operated in a low-voltage output mode or a high-voltage output mode. In low-voltage output mode, the input voltage Vin is greater than a product of the output voltage Vo and a transformer turn ratio n of the transformer 106 (e.g., Vin>Vo×n). The transformer turn ratio n may be a ratio of a number of turns of the first coil 116 relative to a number of turns of the second coil 118. In high-voltage output mode, the input voltage Vin is less than a product of the output voltage Vo and the transformer turn ratio n of the transformer (e.g., Vo×n>Vin). Additionally, each of the first high-side transistor Q11, the first low-side transistor Q12, the second high-side transistor Q21, and the second low-side transistor Q22 may be connected antiparallel to a corresponding freewheeling diode. The freewheeling diodes may provide an alternative current path for the load current during turn off of a respective transistor in order to prevent high voltage peaks and losses.

In the low-voltage output mode, the controller 120 may implement a symmetric PWM switching algorithm to drive the first high-side transistor Q11, the first low-side transistor Q12, the second high-side transistor Q21, and the second low-side transistor Q22 between respective switching states with a same duty cycle to control the voltage differential $V_L$ across the energy transfer inductor 112. In other words, all transistors are driven with the same duty cycle. In addition, the controller 120 is configured to drive the first high-side transistor Q11 180° out-of-phase with respect to the first low-side transistor Q12, and the controller 120 is configured to drive the second high-side transistor Q21 180° out-of-phase with respect to the second low-side transistor Q22. In addition, the same duty cycle used for all of the transistors is less than 50% such that the first high-side transistor Q11, the first low-side transistor Q12, the second high-side transistor Q21, and the second low-side transistor Q22 are simultaneously off for a predetermined interval. In some implementations, the controller 120 is configured to drive the first high-side transistor Q11, the first low-side transistor Q12, the second high-side transistor Q21, and the second low-side transistor Q22 in a discontinuous conduction mode.

During the predetermined interval, the voltage differential $V_L$ across the energy transfer inductor 112 is driven to zero and maintained at zero for a predetermined duration such that the inductor current $I_L$ is reduced. The predetermined interval, during which the first high-side transistor Q11, the first low-side transistor Q12, the second high-side transistor Q21, and the second low-side transistor Q22 are simultaneously off, may include a dead time during which transistors of a same half-bridge are simultaneously off to prevent shoot-through by ensuring that the two transistors of the same half-bridge will not be on simultaneously. Thus, the predetermined interval may include the dead time for the first bridge 110 and the second bridge 114, as well as additional time for the voltage differential $V_L$ across the energy transfer inductor 112 is driven to zero and maintained at zero for the predetermined duration.

In some implementations, the inductor current $I_L$ may be reduced to zero if the first high-side transistor Q11, the first low-side transistor Q12, the second high-side transistor Q21, and the second low-side transistor Q22 are simultaneously off for a sufficient amount of time for the inductor current $I_L$ to reach zero. The closer the inductor current $I_L$ is to zero, the lower the switching and/or conduction losses will be on the secondary side of the DAB circuit 100. Thus, during the predetermined interval, the inductor current $I_L$ is driven toward zero for the predetermined duration. In some implementations, during the predetermined interval, the inductor current $I_L$ is driven to zero or substantially zero for the predetermined duration. In either case, the inductor current $I_L$ is maintained substantially stable during the predetermined duration that the voltage differential $V_L$ across the energy transfer inductor 112 is zero. For example, the blocking capacitor CB may assist in stabilizing the inductor current $I_L$ at a reduced current value.

The first high-side transistor Q11, the first low-side transistor Q12, the second high-side transistor Q21, and the second low-side transistor Q22 are simultaneously off for the predetermined interval such that the voltage differential $V_L$ across the energy transfer inductor 112 is driven to and maintained at zero, the inductor current $I_L$ is reduced, and a load current of the second high-side transistor Q21 is reduced for each turn-on of the second high-side transistor Q21. The load current may be a current flowing through the transistor between a source and a drain (e.g., a drain current) or current flowing through the transistor between a collector and an emitter (e.g., a collector current), depending on a type of transistor. As a result, the switching and/or conduction losses of the second high-side transistor Q21 are reduced. In addition, a load current of the second low-side transistor Q22 may also be reduced for each turn-on of the second low-side transistor. As a result, the switching and/or conduction losses of the second low-side transistor Q22 are reduced. Thus, the switching and/or conduction losses on the secondary side as a whole can be reduced, resulting in a more efficient operation of the DAB circuit 100.

In some implementations, the first high-side transistor Q11, the first low-side transistor Q12, the second high-side transistor Q21, and the second low-side transistor Q22 are simultaneously off for the predetermined interval such that the voltage differential $V_L$ across the energy transfer inductor 112 is driven to and maintained at zero, the inductor current $I_L$ is reduced, and the load current of the second high-side transistor Q21 is zero or substantially zero at each turn-on of the second high-side transistor Q21 and a load current of the second low-side transistor Q22 is zero or substantially zero at each turn-on of the second low-side transistor Q22. As a result, the switching loss of the second high-side transistor Q21 is substantially zero during each turn-on of the second high-side transistor Q21. In addition, a conduction loss of the second high-side transistor Q21 is reduced and a conduction loss of the second low-side transistor Q22 is reduced.

In the high-voltage output mode, the controller 120 may implement a complementary PWM switching algorithm to drive the first high-side transistor Q11, the first low-side transistor Q12, the second high-side transistor Q21, and the second low-side transistor Q22 between respective switching states to control the voltage differential $V_L$ across the energy transfer inductor 112. The controller 120 may be configured to drive the first high-side transistor Q11 and the first low-side transistor Q12 in a complementary manner such that the first high-side transistor Q11 and the first low-side transistor Q12 are driven in opposite switching states. A dead time may be imposed by the controller 120 during which both the first high-side transistor Q11 and the first low-side transistor Q12 are simultaneously off to prevent shoot-through by ensuring that the two transistors of the half-bridge 110 will not be on simultaneously. In addition, the controller 120 may be configured to drive the second high-side transistor Q21 and the second low-side transistor Q22 in a complementary manner, and may also impose a dead time during which both the second high-side transistor Q21 and the second low-side transistor Q22 are simultaneously off to prevent shoot-through.

The controller 120 may be configured to drive the first high-side transistor Q11 and the second high-side transistor Q21 with a same duty cycle that is different than 50%. In addition, the controller 120 may be configured to drive the second high-side transistor with a first phase shift relative to the first high-side transistor Q11, the first phase shift being different than zero. For example, the controller 120 may be configured to drive the second high-side transistor Q21 180° out-of-phase with respect to the first high-side transistor Q11.

The controller 120 is configured to drive the first half-bridge 110 and the second half-bridge 114 in order to drive the voltage differential $V_L$ across the energy transfer inductor 112 to zero and maintain the voltage differential $V_L$ across the energy transfer inductor 112 at zero for a predetermined interval, causing the inductor current $I_L$ to be clipped at or limited to a reduced current level. In addition, the controller 120 is configured to turn on the first high-side transistor Q11 or turn on the first low-side transistor Q12 when the inductor current $I_L$ is equal to or substantially equal to the reduced current level. As a result, the switching losses and/or the conduction losses on the primary side of the DAB circuit 100 may be reduced. For example, because the inductor current $I_L$ may be equal to or substantially equal to the reduced current level when the first high-side transistor Q11 is turned on, the switching losses and/or the conduction losses associated with the first high-side transistor Q11 may be reduced. Alternatively, because the inductor current $I_L$ may be equal to or substantially equal to the reduced current level when the first low-side transistor Q12 is turned on, the switching losses and/or the conduction losses associated with the first low-side transistor Q12 may be reduced.

In addition, the controller 120 may be configured to drive the first low-side transistor Q12 and the second low-side transistor Q22 to be on simultaneously in order to drive the voltage differential $V_L$ across the energy transfer inductor 112 to zero and maintain the voltage differential $V_L$ across the energy transfer inductor 112 at zero for the predetermined interval, causing the inductor current $I_L$ to be clipped at or limited to the reduced current level, or the controller 120 may be configured to drive the first high-side transistor Q11 and the second high-side transistor Q21 to be on simultaneously in order to drive the voltage differential $V_L$ across the energy transfer inductor 112 to zero and maintain the voltage differential $V_L$ across the energy transfer inductor 112 at zero for the predetermined interval, causing the inductor current $I_L$ to be clipped at or limited to the reduced current level. In the former case, the controller 120 may turn on the first high-side transistor Q11 when the inductor current $I_L$ is equal to or substantially equal to the reduced current level such that the switching losses and/or the conduction losses associated with the first high-side transistor Q11 may be reduced. In the latter case, the controller 120 may turn on the first low-side transistor Q12 when the inductor current $I_L$ is equal to or substantially equal to the reduced current level such that the switching losses and/or the conduction losses associated with the first low-side transistor Q12 may be reduced.

As a result, the switching and/or conduction losses of the first high-side transistor Q11 or the first low-side transistor Q12 are reduced. Thus, the switching and/or conduction losses on the primary side as a whole can be reduced, resulting in a more efficient operation of the DAB circuit 100.

As indicated above, FIG. 1 is provided as an example. Other examples may differ from what is described with regard to FIG. 1. The number and arrangement of components shown in FIG. 1 are provided as an example. In practice, the DAB circuit 100 may include additional components, fewer components, different components, or differently arranged components than those shown in FIG. 1. Two or more components shown in FIG. 1 may be implemented within a single component, or a single component shown in FIG. 1 may be implemented as multiple, distributed components. Additionally, or alternatively, a set of components (e.g., one or more components) of the DAB circuit 100 may perform one or more functions described as being performed by another set of components of the DAB circuit 100. For example, the switching control algorithms described above for the low-voltage output mode and the high-voltage output mode may be extended to full-bridge DAB circuits and multi-phase DAB circuits that have three or more phases.

Figure 2:
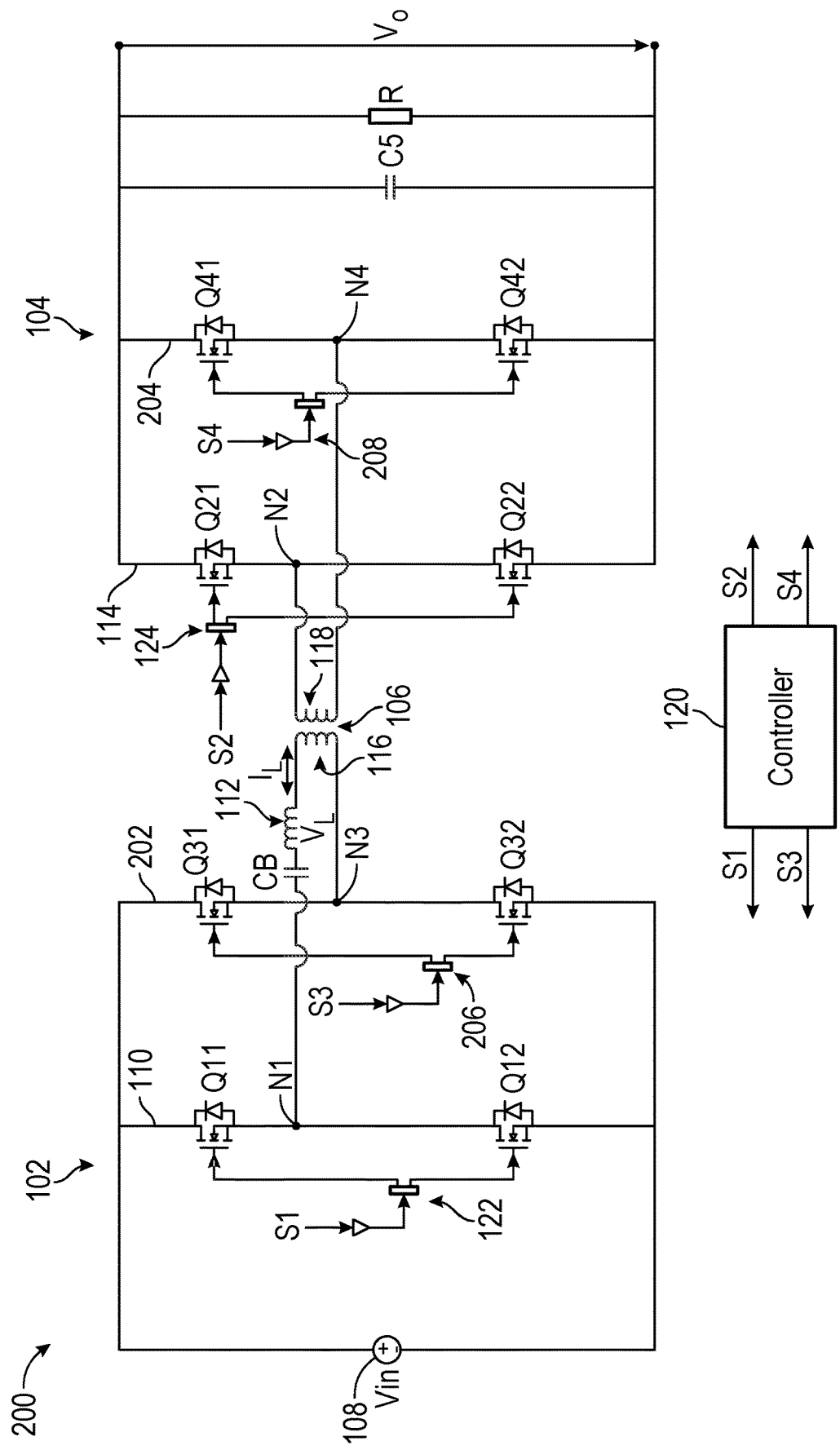
FIG. 2 illustrates a schematic diagram of a DAB circuit according to one or more implementations.

FIG. 2 illustrates a schematic diagram of a DAB circuit 200 according to one or more implementations. For example, the DAB circuit 200 may be a DAB converter that includes the primary side circuit 102, the secondary side circuit 104, and the transformer 106 that is configured to transfer energy between the primary side circuit 102 and the secondary side circuit 104 while providing galvanic isolation between the primary side circuit 102 and the secondary side circuit 104.

The DAB circuit 200 may be a full-bridge DAB that includes a full half-bridge (e.g., two half-bridges) on the primary side and another full half-bridge (e.g., two half-bridges) on the secondary side. Thus, the DAB circuit 200 is similar to the DAB circuit 100 described in connection with FIG. 1, with additional components for driving the full-bridges.

In addition to the first half-bridge 110, the primary side circuit 102 comprises a third half-bridge 202 comprising a third high-side transistor Q31 and a third low-side transistor Q32 electrically coupled at a third node N3 that is electrically coupled to the energy transfer inductor 112 (e.g., through the first coil 116).

In addition, while not shown, a blocking capacitor may be added to the secondary side circuit 104 (e.g., coupled to and between the second coil 118 and the second node N2) in order to eliminate DC current bias when energy is transferred from the second side circuit 104 to the primary side circuit 102.

In addition to the second half-bridge 114, the secondary side circuit 104 further comprises a fourth half-bridge 204 comprising a fourth high-side transistor Q41 and a fourth low-side transistor Q42 electrically coupled at a fourth node N4 that is electrically coupled to the second coil 118. The secondary side circuit 104 may include a bridge capacitor C5 that is configured to stabilize the output voltage Vo.

The controller 120 is configured to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 between respective switching states according to a switching control algorithm to control the voltage differential $V_L$ across the energy transfer inductor 112. As a result, the controller 120 also controls the inductor current $I_L$ and the energy transfer between the primary side circuit 102 and the secondary side circuit 104. For example, the controller 120 may generate control signals S1, S2, S3, and S4 that are applied to the half-bridges 110, 114, 202, and 204, respectively, in a manner to generate the voltage differential $V_L$ across the energy transfer inductor 112 and direct the stored energy of the energy transfer inductor 112. The DAB circuit 200 may include a third driver circuit 206 that is configured to receive the control signal S3 and control the respective switching states of the third high-side transistor Q31 and the third low-side transistor Q32 based on the control signal S3. The DAB circuit 200 may also include a fourth driver circuit 208 that is configured to receive the control signal S4 and control the respective switching states of the fourth high-side transistor Q41 and the fourth low-side transistor Q42 based on the control signal S4.

The DAB circuit 200 may be operated in the low-voltage output mode or the high-voltage output mode. In the low-voltage output mode, the controller 120 may implement the symmetric PWM switching algorithm to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 between respective switching states with the same duty cycle to control the voltage differential $V_L$ across the energy transfer inductor 112. The controller 120 may drive the first half-bridge 110 and the second half-bridge 114 in a similar manner as described above in connection with FIG. 1. In addition, the controller 120 may drive the third high-side transistor Q31 180° out-of-phase with respect to the third low-side transistor Q32. The controller 120 may drive the fourth high-side transistor Q41 180° out-of-phase with respect to the fourth low-side transistor Q42. In addition, the same duty cycle is less than 50% such that the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are simultaneously off for the predetermined interval. The predetermined interval may include a dead time for each half-bridge. Additionally, the controller 120 may be configured to drive the third high-side transistor Q31 180° out-of-phase with respect to the first high-side transistor Q11. As a result, during the predetermined interval, the voltage differential $V_L$ across the energy transfer inductor 112 is driven to zero and maintained at zero for a predetermined duration such that the inductor current $I_L$ is reduced.

The first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are simultaneously off for the predetermined interval such that the voltage differential $V_L$ across the energy transfer inductor 112 is driven to and maintained at zero, the inductor current $I_L$ is reduced, and a load current of the second high-side transistor Q21 is reduced for each turn-on of the second high-side transistor Q21. As a result, the switching and/or conduction losses of the second high-side transistor Q21 are reduced. In addition, a load current of the second low-side transistor Q22 may also be reduced for each turn-on of the second low-side transistor. As a result, the switching and/or conduction losses of the second low-side transistor Q22 are reduced. Thus, the switching and/or conduction losses on the secondary side as a whole can be reduced, resulting in a more efficient operation of the DAB circuit 200.

In the high-voltage output mode, the controller 120 may implement a complementary PWM switching algorithm to drive the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 between respective switching states to control the voltage differential $V_L$ across the energy transfer inductor 112.

The controller 120 may drive the first half-bridge 110 and the second half-bridge 114 in a similar manner as described above in connection with FIG. 1. In addition, the controller 120 may drive the third high-side transistor Q31 and the third low-side transistor Q32 in a complementary manner such that the third high-side transistor Q31 and the third low-side transistor Q32 are driven in opposite switching states. A dead time may be imposed by the controller 120 during which both the third high-side transistor Q31 and the third low-side transistor Q32 are simultaneously off to prevent shoot-through. In addition, the controller 120 may be configured to drive the fourth high-side transistor Q41 and the fourth low-side transistor Q42 in a complementary manner, and may also impose a dead time during which both the fourth high-side transistor Q41 and the fourth low-side transistor Q42 are simultaneously off to prevent shoot-through.

The controller 120 may be configured to drive the first high-side transistor Q11, the second high-side transistor Q21, the third high-side transistor Q31, and the fourth high-side transistor Q41 with a same duty cycle that is different than 50%. In addition, the controller 120 may be configured to drive the fourth high-side transistor Q41 with a second phase shift relative to the third high-side transistor Q31, with the second phase shift being equal to the first phase shift. Moreover, the controller 120 may drive the first high-side transistor Q11 and the third high-side transistor Q31 with an equidistant phase shift relative to each other. In other words, the controller 120 may drive the first high-side transistor Q11 and the third high-side transistor Q31 180° out-of-phase with respect to each other. Similarly, the second high-side transistor Q21 and the fourth high-side transistor Q41 may be driven 180° out-of-phase with respect to each other.

The controller 120 is configured to drive the first half-bridge 110, the second half-bridge 114, the third half-bridge 202, and the fourth half-bridge 204 in order to drive the voltage differential $V_L$ across the energy transfer inductor 112 to zero and maintain the voltage differential $V_L$ across the energy transfer inductor 112 at zero for a predetermined interval, causing the inductor current $I_L$ to be clipped at or limited to a reduced current level. In addition, the controller 120 is configured to turn on the first high-side transistor Q11 or turn on the first low-side transistor Q12 when the inductor current $I_L$ is equal to or substantially equal to the reduced current level. As a result, the switching losses and/or the conduction losses on the primary side of the DAB circuit 200 may be reduced. For example, because the inductor current $I_L$ may be equal to or substantially equal to the reduced current level when the first high-side transistor Q11 is turned on, the switching losses and/or the conduction losses associated with the first high-side transistor Q11 may be reduced. Alternatively, because the inductor current $I_L$ may be equal to or substantially equal to the reduced current level when the first low-side transistor Q12 is turned on, the switching losses and/or the conduction losses associated with the first low-side transistor Q12 may be reduced.

In addition, the controller 120 may be configured to drive the first low-side transistor Q12, the second low-side transistor Q22, the third low-side transistor Q32, and the fourth low-side transistor Q42 to be on simultaneously in order to drive the voltage differential $V_L$ across the energy transfer inductor 112 to zero and maintain the voltage differential $V_L$ across the energy transfer inductor 112 at zero for the predetermined interval, causing the inductor current $I_L$ to be clipped at or limited to the reduced current level, or the controller 120 may be configured to drive the first high-side transistor Q11, the second high-side transistor Q21, the third high-side transistor Q31, and the fourth high-side transistor Q41 to be on simultaneously in order to drive the voltage differential $V_L$ across the energy transfer inductor 112 to zero and maintain the voltage differential $V_L$ across the energy transfer inductor 112 at zero for the predetermined interval, causing the inductor current $I_L$ to be clipped at the reduced current level. In the former case, the controller 120 may turn on the first high-side transistor Q11 when the inductor current $I_L$ is equal to or substantially equal to the reduced current level, such that the switching losses and/or the conduction losses associated with the first high-side transistor Q11 may be reduced. In the latter case, the controller 120 may turn on the first low-side transistor Q12 when the inductor current $I_L$ is equal to or substantially equal to the reduced current level, such that the switching losses and/or the conduction losses associated with the first low-side transistor Q12 may be reduced.

As a result, the switching and/or conduction losses of the first high-side transistor Q11 or the first low-side transistor Q12 are reduced. Thus, the switching and/or conduction losses on the primary side as a whole can be reduced, resulting in a more efficient operation of the DAB circuit 200.

As indicated above, FIG. 2 is provided as an example. Other examples may differ from what is described with regard to FIG. 2. The number and arrangement of components shown in FIG. 2 are provided as an example. In practice, the DAB circuit 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the DAB circuit 200 may perform one or more functions described as being performed by another set of components of the DAB circuit 200. For example, the switching control algorithms described above for the low-voltage output mode and the high-voltage output mode may be extended to multi-phase DAB circuits that have three or more phases.

Figure 3:
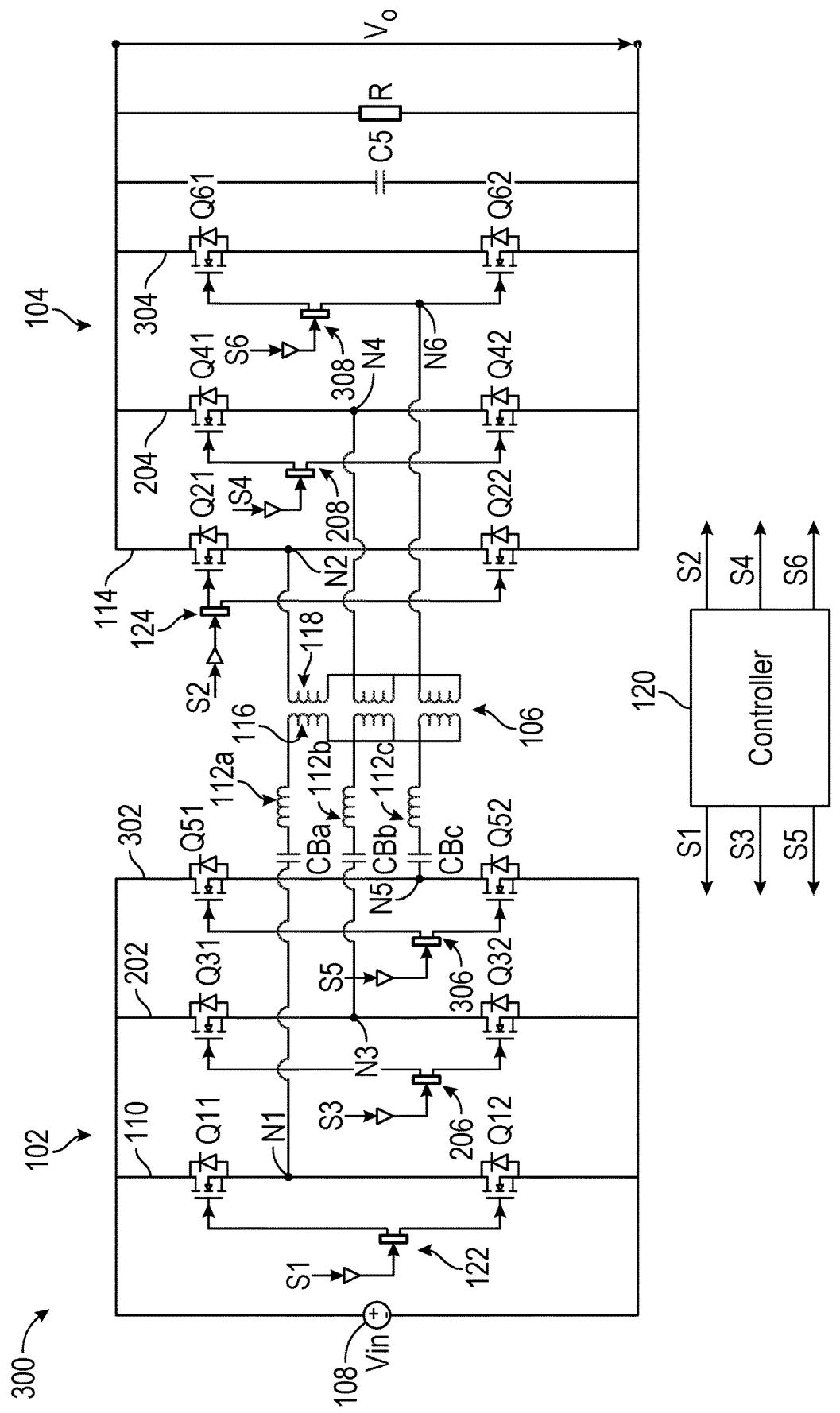
FIG. 3 illustrates a schematic diagram of a DAB circuit according to one or more implementations.

FIG. 3 illustrates a schematic diagram of a DAB circuit 300 according to one or more implementations. For example, the DAB circuit 300 may be a DAB converter that includes the primary side circuit 102, the secondary side circuit 104, and the transformer 106 that is configured to transfer energy between the primary side circuit 102 and the secondary side circuit 104 while providing galvanic isolation between the primary side circuit 102 and the secondary side circuit 104.

The DAB circuit 300 may be a three-phase DAB that includes three half-bridges for generating three phase currents on the primary side and another three half-bridge for generating three phase currents on the secondary side. Thus, the DAB circuit 300 is similar to the DAB circuits 100 and 200 described in connection with FIGS. 1 and 2, with additional components for driving the six half-bridges.

The transformer 106 may include three sub-transformers, each comprising a respective pair of primary and secondary coils. Each sub-transformer may be configured to transfer energy corresponding to a respective phase of the three-phase DAB. For example, the sub-transformers may be connected to the primary side circuit 102 and the secondary side circuit 104 by a Y-connection configuration, as shown in FIG. 3. In some implementations, the sub-transformers may be connected to the primary side circuit 102 and the secondary side circuit 104 by a different connection configuration, such as a delta-connection configuration.

In addition to the first half-bridge 110 and the third half-bridge 202, the primary side circuit 102 comprises a fifth half-bridge 302 comprising a fifth high-side transistor Q51 and a fifth low-side transistor Q52 electrically coupled at a fifth node N5 that is electrically coupled indirectly to the energy transfer inductor 112 (e.g., through the first coil 116).

In addition to the second half-bridge 114 and the fourth half-bridge 204, the secondary side circuit 104 further comprises a sixth half-bridge 304 comprising a sixth high-side transistor Q61 and a sixth low-side transistor Q62 electrically coupled at a sixth node N6 that is electrically coupled indirectly to the second coil 118.

The DAB circuit 300 includes three energy transfer inductors 112a, 112b, and 112c, with each of the energy transfer inductors 112a, 112b, and 112c being respectively coupled to one of the sub-transformers directly and to the other sub-transformers indirectly through the Y-connection. The DAB circuit 300 may also include three blocking capacitors CBa, CBb, and CBc that are respectively coupled to one of the first half-bridge 110, the third half-bridge 202, or the fifth half-bridge 302. Controlling a respective voltage differential $V_L$ across each of the energy transfer inductors 112a, 112b, and 112c, controls the energy transfer for each of the three phases, respectively. In addition, while not shown, additional blocking capacitors may be added to the secondary side circuit 104 between each secondary coil and each half-bridge in order to eliminate DC current bias when energy is transferred from the second side circuit 104 to the primary side circuit 102.

The controller 120 is configured to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, the fourth low-side transistor Q42, the fifth high-side transistor Q51, the fifth low-side transistor Q52, the sixth high-side transistor Q61, and the sixth low-side transistor Q62 between respective switching states according to a switching control algorithm to control the voltage differential $V_L$ across the energy transfer inductor 112. As a result, the controller 120 also controls the inductor currents $I_L$ of the energy transfer inductors 112a, 112b, and 112c and controls the energy transfer between the primary side circuit 102 and the secondary side circuit 104. For example, the controller 120 may generate control signals S1, S2, S3, S4, S5, and S6 that are applied to the half-bridges 110, 114, 202, 204, 302, and 304 respectively, in a manner to generate the voltage differentials $V_L$ across the energy transfer inductors 112a, 112b, and 112c and direct the stored energy of the energy transfer inductors 112a, 112b, and 112c. The DAB circuit 300 may include a fifth driver circuit 306 that is configured to receive the control signal S5 and control the respective switching states of the fifth high-side transistor Q51 and the fifth low-side transistor Q52 based on the control signal S5. The DAB circuit 300 may also include a sixth driver circuit 308 that is configured to receive the control signal S6 and control the respective switching states of the sixth high-side transistor Q61 and the sixth low-side transistor Q62 based on the control signal S6.

The DAB circuit 300 may be operated in the low-voltage output mode or the high-voltage output mode. In the low-voltage output mode, the controller 120 may implement the symmetric PWM switching algorithm to drive each of the first high-side transistor Q11, the first low-side transistor Q12, the second high-side transistor Q21, the second low-side transistor Q22, the third high-side transistor Q31, the third low-side transistor Q32, the fourth high-side transistor Q41, the fourth low-side transistor Q42, the fifth high-side transistor Q51, the fifth low-side transistor Q52, the sixth high-side transistor Q61, and the sixth low-side transistor Q62 between respective switching states with the same duty cycle to control the voltage differentials $V_L$ across the energy transfer inductors 112a, 112b, and 112c.

The controller 120 may drive the first half-bridge 110 and the second half-bridge 114 in a similar manner as described above in connection with FIG. 1, and may drive the third half-bridge 202 and the fourth half-bridge 204 in a similar manner as described above in connection with FIG. 2. In addition, the controller 120 may drive the fifth high-side transistor Q51 180° out-of-phase with respect to the fifth low-side transistor Q52. The controller 120 may drive the sixth high-side transistor Q61 180° out-of-phase with respect to the sixth low-side transistor Q62.

In addition, the same duty cycle is less than 50% such that the first high-side transistor Q11, the first low-side transistor Q12, the second high-side transistor Q21, the second low-side transistor Q22 are simultaneously off for a first predetermined interval; the third high-side transistor Q31, the third low-side transistor Q32, the fourth high-side transistor Q41, the fourth low-side transistor Q42 are simultaneously off for a second predetermined interval; and the fifth high-side transistor Q51, the fifth low-side transistor Q51, the sixth high-side transistor Q61, and the sixth low-side transistor Q62 are simultaneously off for a third predetermined interval. Additionally, the controller 120 may be configured to drive the first high-side transistor Q11, the third high-side transistor Q31, and the fifth high-side transistor Q51 with equidistant phase shifts relative to each other (e.g., 120° out of phase with respect to each other). Similarly, the controller 120 may be configured to drive the first low-side transistor Q12, the third low-side transistor Q32, and the fifth low-side transistor Q52 with equidistant phase shifts relative to each other (e.g., 120° out of phase with respect to each other). Thus, the first predetermined interval, the second predetermined interval, and the third predetermined interval may also have equidistant phase shifts relative to each other (e.g., 120° out of phase with respect to each other).

During the first predetermined interval, the voltage differential $V_L$ across the energy transfer inductor 112a is driven to zero and maintained at zero for a predetermined duration such that the inductor current $I_L$ of the energy transfer inductor 112a is reduced. During the second predetermined interval, the voltage differential $V_L$ across the energy transfer inductor 112b is driven to zero and maintained at zero for a predetermined duration such that the inductor current $I_L$ of the energy transfer inductor 112b is reduced. During the first predetermined interval, the voltage differential $V_L$ across the energy transfer inductor 112c is driven to zero and maintained at zero for a predetermined duration such that the inductor current $I_L$ of the energy transfer inductor 112c is reduced. As a result, a load current of the second high-side transistor Q21 may be reduced for each turn-on of the second high-side transistor Q21, a load current of the fourth high-side transistor Q41 may be reduced for each turn-on of the fourth high-side transistor Q41, and a load current of the sixth high-side transistor Q61 may be reduced for each turn-on of the sixth high-side transistor Q61. As a result, the switching and/or conduction losses of at least one of the second high-side transistor Q21, the fourth high-side transistor Q41, or the sixth high-side transistor Q61 may be reduced. Thus, the switching and/or conduction losses on the secondary side as a whole can be reduced, resulting in a more efficient operation of the DAB circuit 300.

In the high-voltage output mode, the controller 120 may implement a complementary PWM switching algorithm to drive the first high-side transistor Q11, the first low-side transistor Q12, the second high-side transistor Q21, the second low-side transistor Q22, the third high-side transistor Q31, the third low-side transistor Q32, the fourth high-side transistor Q41, the fourth low-side transistor Q42, the fifth high-side transistor Q51, the fifth low-side transistor Q52, the sixth high-side transistor Q61, and the sixth low-side transistor Q62 between respective switching states to control the voltage differentials $V_L$ across the energy transfer inductors 112a, 112b, and 112c.

The controller 120 may drive the first half-bridge 110 and the second half-bridge 114 in a similar manner as described above in connection with FIG. 1, and may drive the third half-bridge 202 and the fourth half-bridge 204 in a similar manner as described above in connection with FIG. 2. In addition, the controller 120 may drive the fifth high-side transistor Q51 and the fifth low-side transistor Q52 in a complementary manner such that the fifth high-side transistor Q51 and the fifth low-side transistor Q52 are driven in opposite switching states. A dead time may be imposed by the controller 120 during which both the fifth high-side transistor Q51 and the fifth low-side transistor Q52 are simultaneously off to prevent shoot-through. In addition, the controller 120 may be configured to drive the sixth high-side transistor Q61 and the sixth low-side transistor Q62 in a complementary manner, and may also impose a dead time during which both the sixth high-side transistor Q61 and the sixth low-side transistor Q62 are simultaneously off to prevent shoot-through.

The controller 120 may be configured to drive the first high-side transistor Q11, the second high-side transistor Q21, the third high-side transistor Q31, the fourth high-side transistor Q41, the fifth high-side transistor Q51, and the sixth high-side transistor Q61 with a same duty cycle that is different than 50%. In addition, the controller 120 may be configured to drive the sixth high-side transistor Q61 with a third phase shift relative to the fifth high-side transistor Q51, with the third phase shift being equal to the first phase shift and the second phase shift. Moreover, the controller 120 may drive the first high-side transistor Q11, the third high-side transistor Q31, and the fifth high-side transistor Q51 with an equidistant phase shift relative to each other (e.g., 120° out-of-phase with respect to each other). Similarly, the second high-side transistor Q21, the fourth high-side transistor Q41, and the sixth high-side transistor Q61 may be driven 120° out-of-phase with respect to each other.

The controller 120 is configured to drive the first half-bridge 110, the second half-bridge 114, the third half-bridge 202, the fourth half-bridge 204, the fifth half-bridge 302, and the sixth half-bridge 304 in order to drive the voltage differentials $V_L$ across the energy transfer inductors 112a, 112b, and 112c to zero and maintain the voltage differentials $V_L$ at zero for a respective predetermined interval. In other words, the voltage differential $V_L$ across each energy transfer inductor 112a, 112b, and 112c may be maintained at zero for a different respective predetermined interval. As a result, the inductor current $I_L$ for each energy transfer inductor 112a, 112b, and 112c is clipped at or limited to a reduced current level during the respective predetermined interval. In addition, the controller 120 is configured to turn on the first high-side transistor Q11 or turn on the first low-side transistor Q12 when the inductor current $I_L$ of the energy transfer inductor 112a is equal to or substantially equal to the reduced current level, turn on the third high-side transistor Q31 or turn on the third low-side transistor Q32 when the inductor current $I_L$ of the energy transfer inductor 112b is equal to or substantially equal to the reduced current level, and turn on the fifth high-side transistor Q51 or turn on the fifth low-side transistor Q52 when the inductor current $I_L$ of the energy transfer inductor 112c is equal to or substantially equal to the reduced current level.

As a result, the switching losses and/or the conduction losses on the primary side of the DAB circuit 300 may be reduced. For example, because the inductor current $I_L$ of the energy transfer inductor 112a may be equal to or substantially equal to the reduced current level when the first high-side transistor Q11 is turned on, the switching losses and/or the conduction losses associated with the first high-side transistor Q11 may be reduced. Alternatively, because the inductor current $I_L$ of the energy transfer inductor 112a may be equal to or substantially equal to the reduced current level when the first low-side transistor Q12 is turned on, the switching losses and/or the conduction losses associated with the first low-side transistor Q12 may be reduced.

In addition, the controller 120 may be configured to drive the first low-side transistor Q12, the second low-side transistor Q22, the third low-side transistor Q32, the fourth low-side transistor Q42, the fifth low-side transistor Q52, and the sixth low-side transistor Q62 to be on simultaneously in order to drive the voltage differential $V_L$ across the energy transfer inductor 112a to zero and maintain the voltage differential $V_L$ across the energy transfer inductor 112a at zero for the predetermined interval, causing the inductor current $I_L$ of the energy transfer inductor 112a to be clipped at or limited to the reduced current level, or the controller 120 may be configured to drive the first high-side transistor Q11, the second high-side transistor Q21, the third high-side transistor Q31, the fourth high-side transistor Q41, the fifth high-side transistor Q51, and the sixth high-side transistor Q61 to be on simultaneously in order to drive the voltage differential $V_L$ across the energy transfer inductor 112a to zero and maintain the voltage differential $V_L$ across the energy transfer inductor 112a at zero for the predetermined interval, causing the inductor current $I_L$ of the energy transfer inductor 112a to be clipped at the reduced current level. In the former case, the controller 120 may turn on the first high-side transistor Q11 when the inductor current $I_L$ is equal to or substantially equal to the reduced current level, such that the switching losses and/or the conduction losses associated with the first high-side transistor Q11 may be reduced. In the latter case, the controller 120 may turn on the first low-side transistor Q12 when the inductor current $I_L$ is equal to or substantially equal to the reduced current level, such that the switching losses and/or the conduction losses associated with the first low-side transistor Q12 may be reduced.

As a result, the switching and/or conduction losses of the first high-side transistor Q11 or the first low-side transistor Q12 are reduced. Thus, the switching and/or conduction losses on the primary side as a whole can be reduced, resulting in a more efficient operation of the DAB circuit 300.

As indicated above, FIG. 3 is provided as an example. Other examples may differ from what is described with regard to FIG. 3. The number and arrangement of components shown in FIG. 3 are provided as an example. In practice, the DAB circuit 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the DAB circuit 300 may perform one or more functions described as being performed by another set of components of the DAB circuit 300. For example, the switching control algorithms described above for the low-voltage output mode and the high-voltage output mode may be extended to DAB circuits with four or more phases.

Figure 4A:
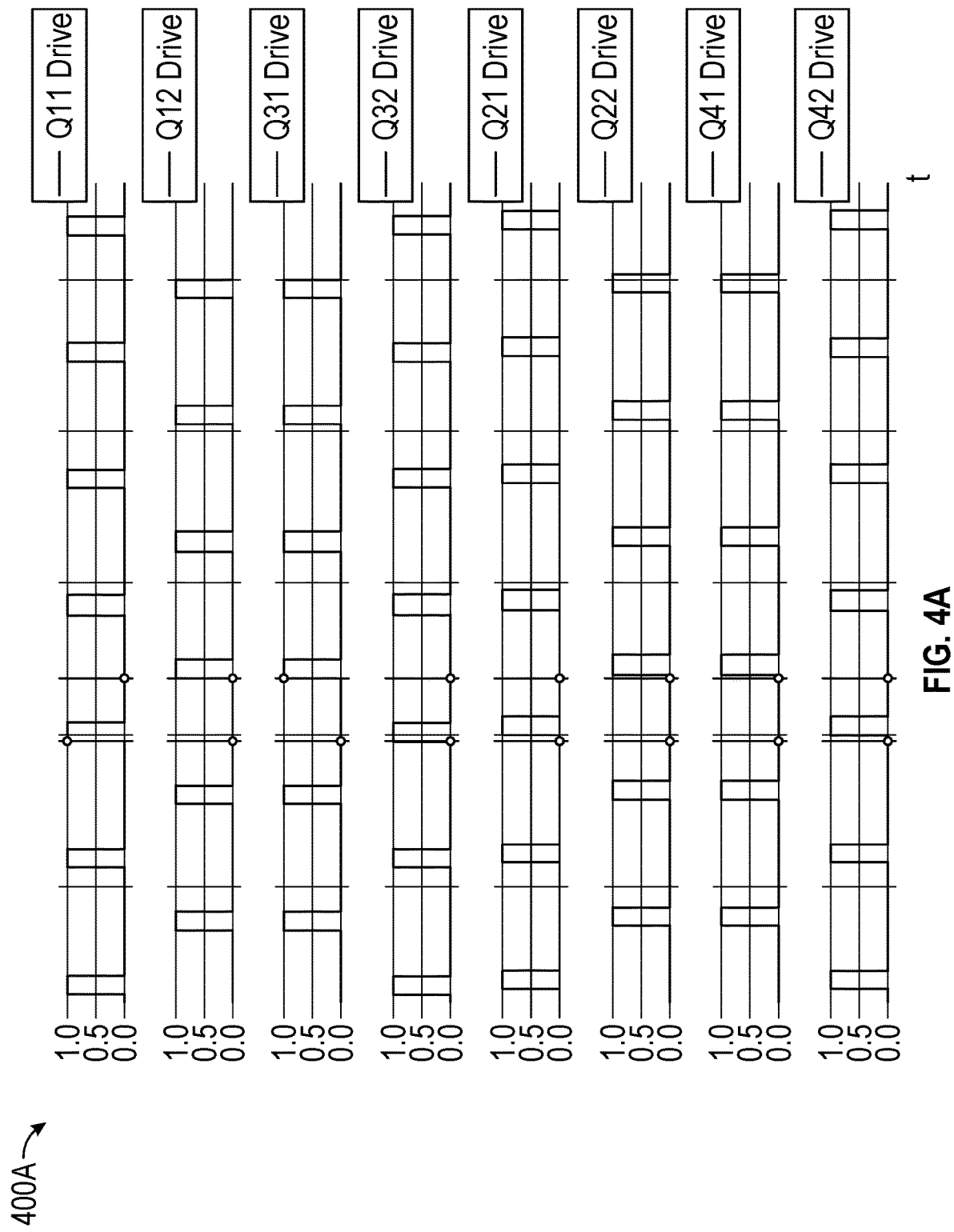
FIG. 4A is a diagram of a plurality of drive signals for controlling switching states within a DAB circuit during a low-voltage output mode.

FIG. 4A is a diagram 400A of a plurality of drive signals for controlling switching states within a DAB circuit during a low-voltage output mode. The DAB circuit being controlled may be a full-bridge DAB circuit similar to the DAB circuit 200 described in connection with FIG. 2. The plurality of drive signals may be PWM signals derived from the control signals S1, S2, S3, and S4 in accordance with a symmetric PWM switching algorithm. In particular, the plurality of drive signals includes drive signals for driving the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42. The plurality of drive signals are square waves that switch between two voltage levels or states (e.g., a low voltage level and a high voltage level). A transistor may be regarded as being on when a respective drive signal is in a high state and may be regarded as being off when the respective drive signal in a low state. The first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are each driven with a same duty cycle that is less than 50%. For example, in the present example, the duty cycle may be 10%.

As indicated above, FIG. 4A is provided as an example. Other examples may differ from what is described with regard to FIG. 4A.

Figure 4B:
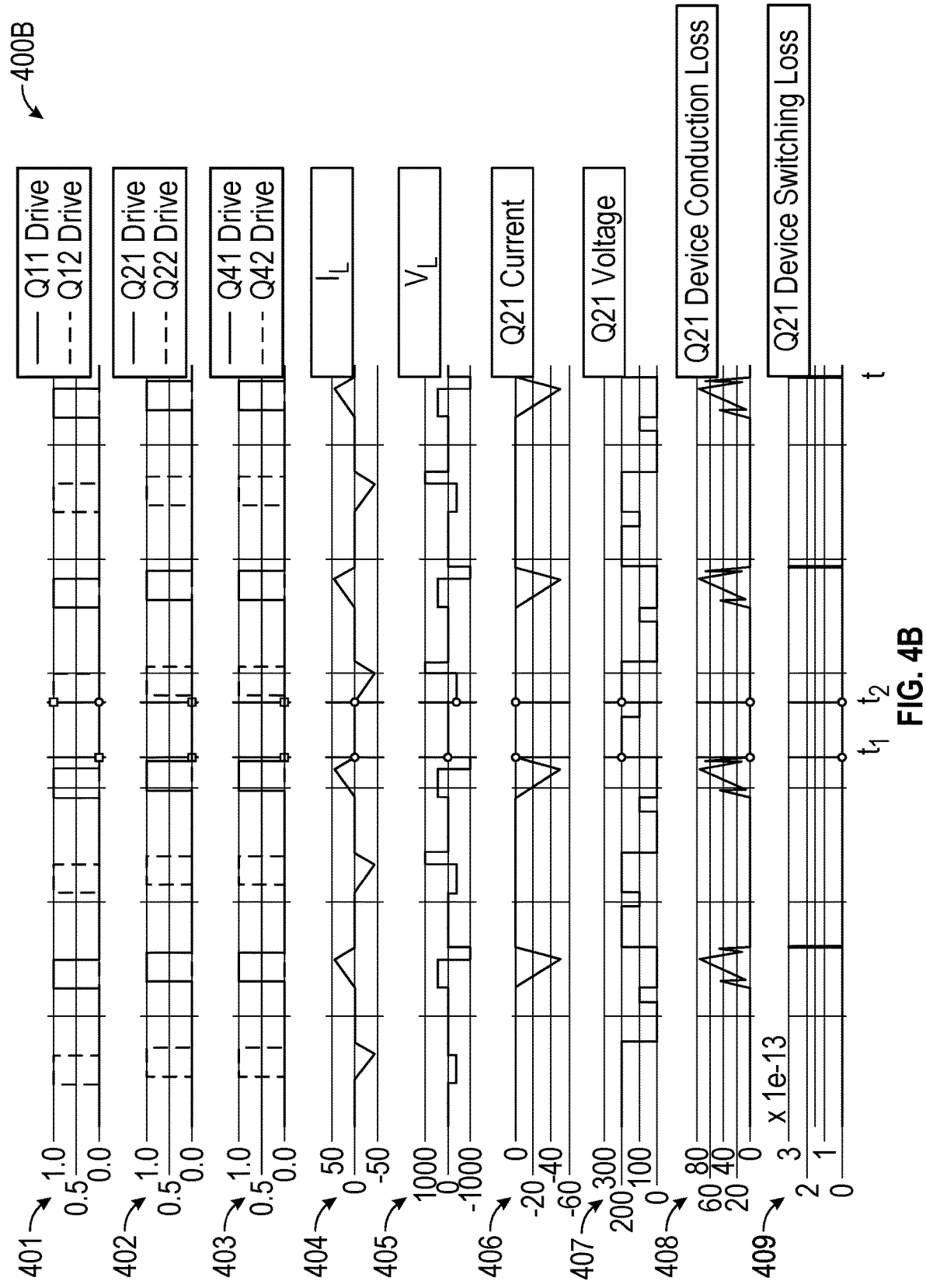
FIG. 4B is a diagram of a plurality of signal waveforms present within a DAB circuit during a low-voltage output mode.

FIG. 4B is a diagram 400B of a plurality of signal waveforms present within a DAB circuit during a low-voltage output mode. The DAB circuit being controlled may be a full-bridge DAB circuit similar to the DAB circuit 200 described in connection with FIG. 2. Waveform diagram 401 shows the drive signals for the first high-side transistor Q11 and the first low-side transistor Q12 superimposed on each other. Waveform diagram 402 shows the drive signals for the second high-side transistor Q21 and the second low-side transistor Q22 superimposed on each other. Waveform diagram 403 shows the drive signals for the fourth high-side transistor Q41 and the fourth low-side transistor Q42 superimposed on each other. While drive signals for the third high-side transistor Q31 and the third low-side transistor Q32 are not shown, the drive signals would be similar to the waveform diagram 401, but phase shifted 180°, as shown in FIG. 4A. Waveform diagram 404 shows the inductor current $I_L$ of the energy transfer inductor 112. Waveform diagram 405 shows the voltage differential $V_L$ across the energy transfer inductor 112. Waveform diagram 406 shows a current (e.g., a load current) of the second high-side transistor Q21. Waveform diagram 407 shows a voltage across load terminals of the second high-side transistor Q21 (e.g., drain-source voltage or a collector-emitter voltage). Waveform diagram 408 shows a conduction loss of the second high-side transistor Q21. Waveform diagram 409 shows a switching loss of the second high-side transistor Q21.

During a time interval defined by time $t_1$ and time $t_2$, the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are simultaneously off for the time interval such that the voltage differential $V_L$ across the energy transfer inductor 112 is driven to and maintained at zero, the inductor current $I_L$ is reduced (e.g., driven toward zero), and the load current of the second high-side transistor Q21 is reduced (e.g., driven toward zero) for each turn-on of the second high-side transistor Q21. In some implementations, the inductor current $I_L$ is reduced to zero and the load current of the second high-side transistor Q21 is reduced to zero. As a result, the switching and the conduction losses of the second high-side transistor Q21 are reduced.

As indicated above, FIG. 4B is provided as an example. Other examples may differ from what is described with regard to FIG. 4B.

Figure 5A:
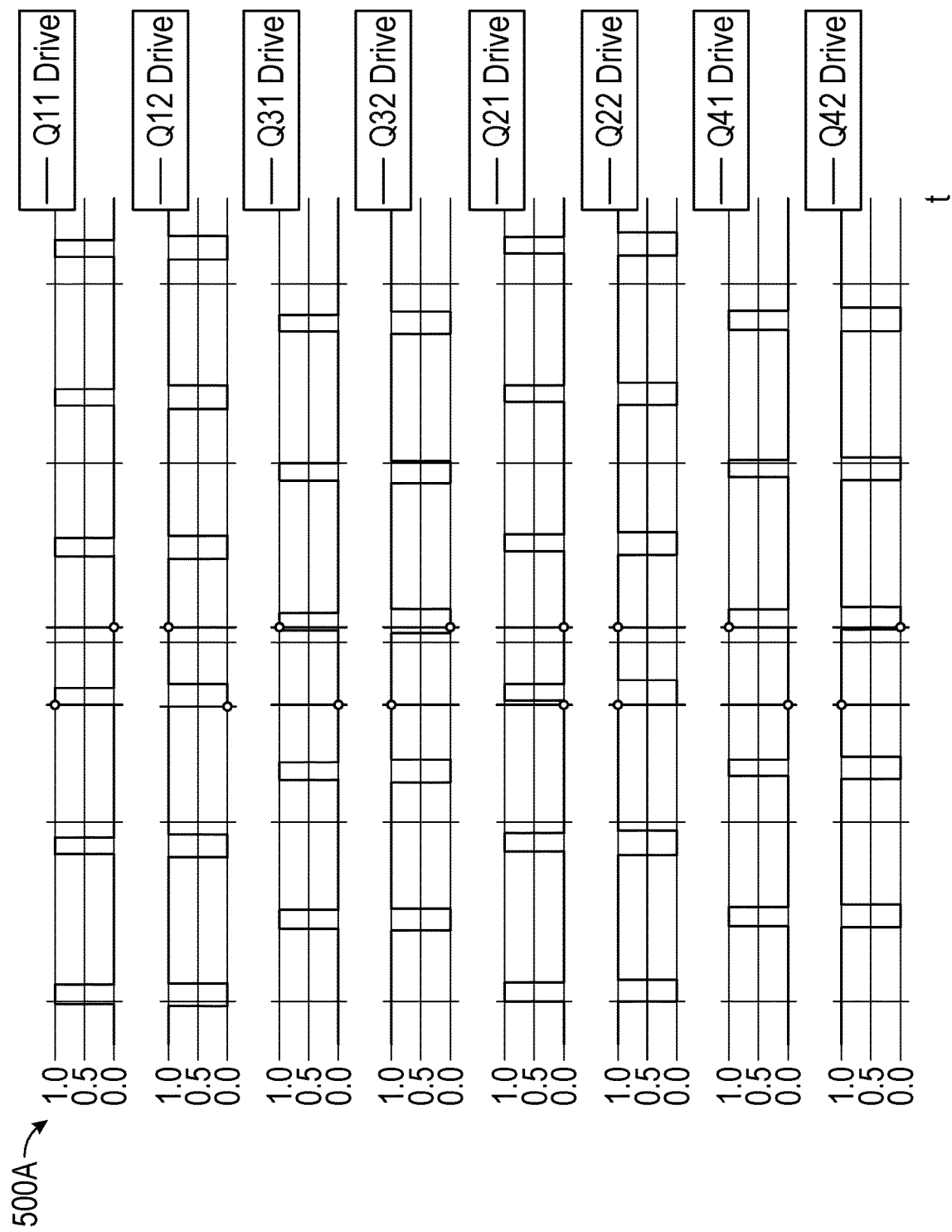
FIG. 5A is a diagram of a plurality of drive signals for controlling switching states within a DAB circuit during a high-voltage output mode.

FIG. 5A is a diagram 500A of a plurality of drive signals for controlling switching states within a DAB circuit during a high-voltage output mode. The DAB circuit being controlled may be a full-bridge DAB circuit similar to the DAB circuit 200 described in connection with FIG. 2. The plurality of drive signals may be PWM signals derived from the control signals S1, S2, S3, and S4 in accordance with a complementary PWM switching algorithm with outer phase shifts. In particular, the plurality of drive signals includes drive signals for driving the first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42. The plurality of drive signals are square waves that switch between two voltage levels or states (e.g., a low voltage level and a high voltage level). A transistor may be regarded as being on when a respective drive signal is in a high state and may be regarded as being off when the respective drive signal in a low state.

The first high-side transistor Q11, the first low-side transistor Q12, the second high-side transistor Q21, the second low-side transistor Q22, the third high-side transistor Q31, the third low-side transistor Q32, the fourth high-side transistor Q41, and the fourth low-side transistor Q42 are each driven as described above in connection with FIG. 2. The controller 120 is configured to drive the first half-bridge 110, the second half-bridge 114, the third half-bridge 202, and the fourth half-bridge 204 in order to drive the voltage differential $V_L$ across the energy transfer inductor 112 to zero and maintain the voltage differential $V_L$ across the energy transfer inductor 112 at zero for the predetermined interval, causing the inductor current $I_L$ to be clipped at or limited to a reduced current level (e.g., zero or substantially zero). The controller 120 may be configured to turn on the first high-side transistor Q11 or turn on the first low-side transistor Q12 when the inductor current $I_L$ is equal to or substantially equal to the reduced current level in order to reduce the switching and the conduction losses on the primary side.

As indicated above, FIG. 5A is provided as an example. Other examples may differ from what is described with regard to FIG. 5A.

Figure 5B:
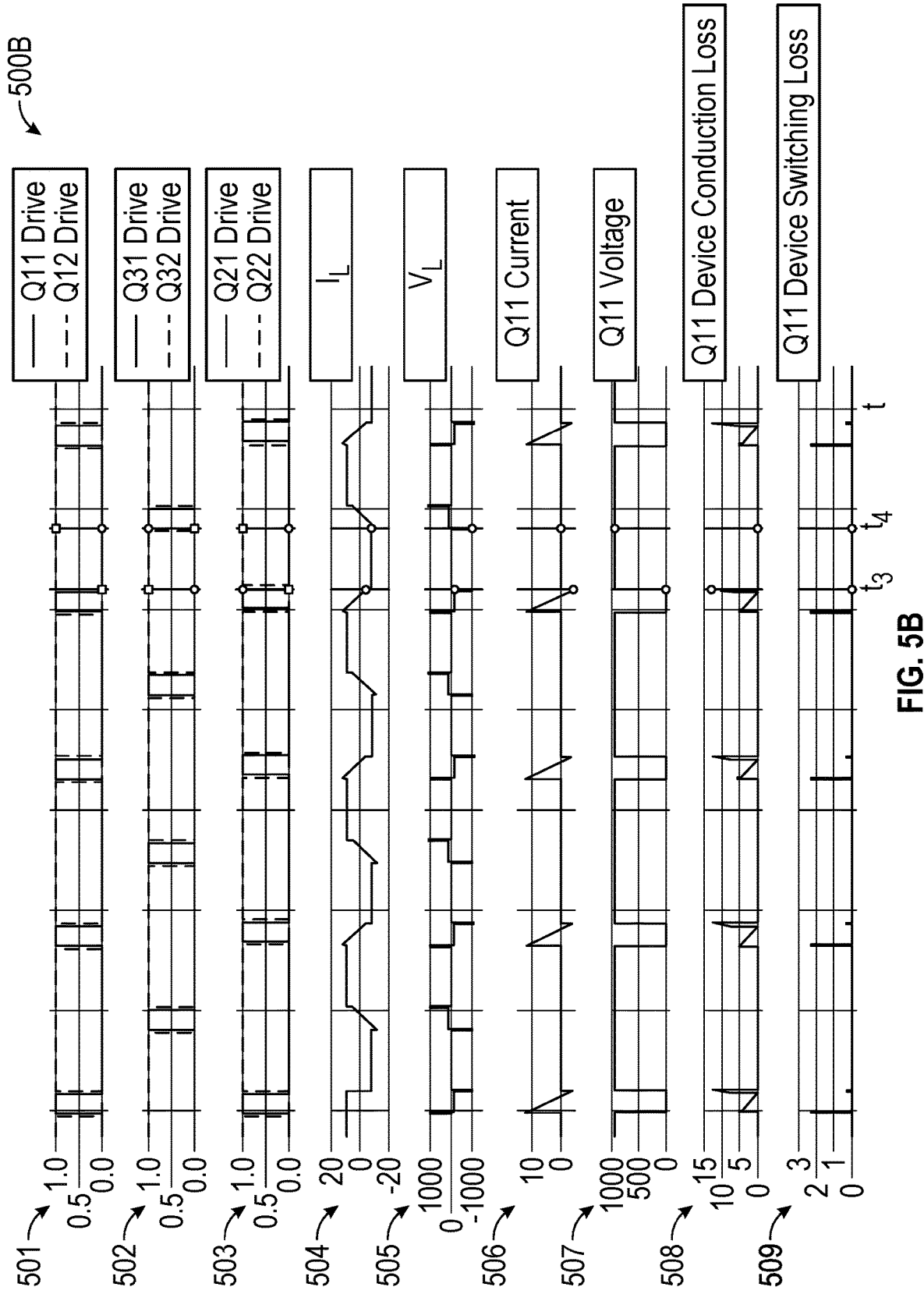
FIG. 5B is a diagram of a plurality of signal waveforms present within a DAB circuit during a high-voltage output mode.

FIG. 5B is a diagram 500B of a plurality of signal waveforms present within a DAB circuit during a high-voltage output mode. The DAB circuit being controlled may be a full-bridge DAB circuit similar to the DAB circuit 200 described in connection with FIG. 2. Waveform diagram 501 shows the drive signals for the first high-side transistor Q11 and the first low-side transistor Q12 superimposed on each other. Waveform diagram 502 shows the drive signals for the third high-side transistor Q31 and the third low-side transistor Q32 superimposed on each other. Waveform diagram 503 shows the drive signals for the second high-side transistor Q21 and the second low-side transistor Q22 superimposed on each other. While drive signals for the fourth high-side transistor Q41 and the fourth low-side transistor Q42 are not shown, they would be similar to the waveform diagram 503, but phase shifted 180°, as shown in FIG. 5A. Waveform diagram 504 shows the inductor current $I_L$ of the energy transfer inductor 112. Waveform diagram 505 shows the voltage differential $V_L$ across the energy transfer inductor 112. Waveform diagram 506 shows a current (e.g., a load current) of the first high-side transistor Q11. Waveform diagram 507 shows a voltage across load terminals of the first high-side transistor Q11 (e.g., drain-source voltage or a collector-emitter voltage). Waveform diagram 508 shows a conduction loss of the first high-side transistor Q11. Waveform diagram 509 shows a switching loss of the first high-side transistor Q11.

During a time interval defined by time $t_3$ and time $t_4$, the first low-side transistor Q12, the second low-side transistor Q22, the third low-side transistor Q32, and the fourth low-side transistor Q42 are on simultaneously in order to drive the voltage differential $V_L$ across the energy transfer inductor 112 to zero and maintain the voltage differential $V_L$ across the energy transfer inductor 112 at zero for the time interval, causing the inductor current $I_L$ to be clipped at or limited to the reduced current level. Moreover, the inductor current $I_L$ is held to be stable or substantially stable (e.g., with a small ripple) during the time interval. The controller 120 is configured to turn on the first high-side transistor Q11 or turn on the first low-side transistor Q12 when the inductor current $I_L$ is equal to or substantially equal to the reduced current level. As a result, the switching and the conduction losses of the first high-side transistor Q11 or the first low-side transistor Q12 are reduced. Thus, the switching and the conduction losses on the primary side are reduced.

As indicated above, FIG. 5B is provided as an example. Other examples may differ from what is described with regard to FIG. 5B.

The following provides an overview of some Aspects of the present disclosure:

Aspect 1: A dual active bridge circuit, comprising: a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, wherein the transformer comprises: a first coil electrically coupled to the energy transfer inductor for receiving the inductor current and a second coil electrically coupled to the second node of the second half-bridge, wherein the first coil is magnetically coupled to the second coil; and a controller configured to drive each of the first high-side transistor, the first low-side transistor, the second high-side transistor, and the second low-side transistor between respective switching states with a same duty cycle to control the voltage differential across the energy transfer inductor, wherein the controller is configured to drive the first high-side transistor 180° out-of-phase with respect to the first low-side transistor, wherein the controller is configured to drive the second high-side transistor 180° out-of-phase with respect to the second low-side transistor wherein the same duty cycle is less than 50% such that the first high-side transistor, the first low-side transistor, the second high-side transistor, and the second low-side transistor are simultaneously off for a predetermined interval.

Aspect 2: The dual active bridge circuit of Aspect 1, wherein, during the predetermined interval, the voltage differential across the energy transfer inductor is driven to zero and maintained at zero for a predetermined duration such that the inductor current is reduced.

Aspect 3: The dual active bridge circuit of Aspect 2, wherein, during the predetermined interval, the inductor current is driven toward zero for the predetermined duration.

Aspect 4: The dual active bridge circuit of Aspect 2, wherein, during the predetermined interval, the inductor current is driven to zero or substantially zero for the predetermined duration.

Aspect 5: The dual active bridge circuit of Aspect 2, wherein, during the predetermined duration, the inductor current is maintained substantially stable.

Aspect 6: The dual active bridge circuit of any of Aspects 1-5, wherein the first high-side transistor, the first low-side transistor, the second high-side transistor, and the second low-side transistor are simultaneously off for the predetermined interval such that: a load current of the second high-side transistor is reduced for each turn-on of the second high-side transistor and a load current of the second low-side transistor is reduced for each turn-on of the second low-side transistor.

Aspect 7: The dual active bridge circuit of any of Aspects 1-6, wherein the first high-side transistor, the first low-side transistor, the second high-side transistor, and the second low-side transistor are simultaneously off for the predetermined interval such that: a load current of the second high-side transistor is zero or substantially zero at each turn-on of the second high-side transistor and a load current of the second low-side transistor is zero or substantially zero at each turn-on of the second low-side transistor.

Aspect 8: The dual active bridge circuit of any of Aspects 1-7, wherein the first high-side transistor, the first low-side transistor, the second high-side transistor, and the second low-side transistor are simultaneously off for the predetermined interval such that: a switching loss of the second high-side transistor is substantially zero during each turn-on of the second high-side transistor.

Aspect 9: The dual active bridge circuit of any of Aspects 1-8, wherein the first high-side transistor, the first low-side transistor, the second high-side transistor, and the second low-side transistor are simultaneously off for the predetermined interval such that: a conduction loss of the second high-side transistor is reduced and a conduction loss of the second low-side transistor is reduced.

Aspect 10: The dual active bridge circuit of any of Aspects 1-9, wherein the controller is configured to drive the first high-side transistor, the first low-side transistor, the second high-side transistor, and the second low-side transistor in a discontinuous conduction mode.

Aspect 11: The dual active bridge circuit of any of Aspects 1-10, wherein the transformer has a transformer turn ratio, and wherein the input voltage is greater than a product of the output voltage and the transformer turn ratio.

Aspect 12: The dual active bridge circuit of any of Aspects 1-11, wherein the primary side circuit further comprises a third half-bridge comprising a third high-side transistor and a third low-side transistor electrically coupled at a third node that is electrically coupled to the energy transfer inductor, wherein the secondary side circuit further comprises a fourth half-bridge comprising a fourth high-side transistor and a fourth low-side transistor electrically coupled at a fourth node that is electrically coupled to the second coil, wherein the controller is configured to drive each of the first high-side transistor, the first low-side transistor, the second high-side transistor, the second low-side transistor, the third high-side transistor, the third low-side transistor, the fourth high-side transistor, and the fourth low-side transistor between respective switching states with the same duty cycle to control the voltage differential across the energy transfer inductor, wherein the controller is configured to drive the third high-side transistor 180° out-of-phase with respect to the third low-side transistor, wherein the controller is configured to drive the fourth high-side transistor 180° out-of-phase with respect to the fourth low-side transistor, wherein the same duty cycle is less than 50% such that the first high-side transistor, the first low-side transistor, the second high-side transistor, the second low-side transistor, the third high-side transistor, the third low-side transistor, the fourth high-side transistor, and the fourth low-side transistor are simultaneously off for the predetermined interval.

Aspect 13: The dual active bridge circuit of Aspect 12, wherein, during the predetermined interval, the voltage differential across the energy transfer inductor is driven to zero and maintained at zero for a predetermined duration such that the inductor current is reduced.

Aspect 14: The dual active bridge circuit of Aspect 12, wherein the controller is configured to drive the third high-side transistor 180° out-of-phase with respect to the first high-side transistor.

Aspect 15: The dual active bridge circuit of Aspect 12, wherein the primary side circuit further comprises a fifth half-bridge comprising a fifth high-side transistor and a fifth low-side transistor electrically coupled at a fifth node that is electrically coupled to the energy transfer inductor, wherein the secondary side circuit further comprises a sixth half-bridge comprising a sixth high-side transistor and a sixth low-side transistor electrically coupled at a sixth node that is electrically coupled to the second coil, wherein the controller is configured to drive each of the first high-side transistor, the first low-side transistor, the second high-side transistor, the second low-side transistor, the third high-side transistor, the third low-side transistor, the fourth high-side transistor, the fourth low-side transistor, the fifth high-side transistor, the fifth low-side transistor, the sixth high-side transistor, and the sixth low-side transistor between respective switching states with the same duty cycle to control the voltage differential across the energy transfer inductor, wherein the controller is configured to drive the fifth high-side transistor 180° out-of-phase with respect to the fifth low-side transistor, wherein the controller is configured to drive the sixth high-side transistor 180° out-of-phase with respect to the sixth low-side transistor, wherein the same duty cycle is less than 50% such that the first high-side transistor, the first low-side transistor, the second high-side transistor, the second low-side transistor are simultaneously off for a first predetermined interval; the third high-side transistor, the third low-side transistor, the fourth high-side transistor, the fourth low-side transistor are simultaneously off for a second predetermined interval; and the fifth high-side transistor, the fifth low-side transistor, the sixth high-side transistor, and the sixth low-side transistor are simultaneously off for a third predetermined interval.

Aspect 16: The dual active bridge circuit of Aspect 15, wherein, during the first predetermined interval, the voltage differential across the energy transfer inductor is driven to zero and maintained at zero for a predetermined duration such that the inductor current is reduced.

Aspect 17: The dual active bridge circuit of Aspect 15, wherein the controller is configured to drive the first high-side transistor, the third high-side transistor, and the fifth high-side transistor with equidistant phase shifts relative to each other.

Aspect 18: A dual active bridge circuit, comprising: a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, wherein the transformer comprises: a first coil electrically coupled to the energy transfer inductor for receiving the inductor current and a second coil electrically coupled to the second node of the second half-bridge, wherein the first coil is magnetically coupled to the second coil; and a controller configured to drive each of the first high-side transistor, the first low-side transistor, the second high-side transistor, and the second low-side transistor between respective switching states to control the voltage differential across the energy transfer inductor, wherein the controller is configured to drive the first high-side transistor and the first low-side transistor in a complementary manner, wherein the controller is configured to drive the second high-side transistor and the second low-side transistor in a complementary manner, wherein the controller is configured to drive the first high-side transistor and the second high-side transistor with a same duty cycle that is different than 50%, wherein the controller is configured to drive the second high-side transistor with a first phase shift relative to the first high-side transistor, the first phase shift being different than zero, wherein the controller is configured to drive the first half-bridge and the second half-bridge in order to drive the voltage differential across the energy transfer inductor to zero and maintain the voltage differential across the energy transfer inductor at zero for a predetermined interval causing the inductor current to be clipped at a reduced current level, and wherein the controller is configured to turn on the first high-side transistor or turn on the first low-side transistor when the inductor current is equal to or substantially equal to the reduced current level.

Aspect 19: The dual active bridge circuit of Aspect 18, wherein the controller is configured to drive the first low-side transistor and the second low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or wherein the controller is configured to drive the first high-side transistor and the second high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

Aspect 20: The dual active bridge circuit of any of Aspects 18-19, wherein the primary side circuit further comprises a third half-bridge comprising a third high-side transistor and a third low-side transistor electrically coupled at a third node that is electrically coupled to the energy transfer inductor, wherein the secondary side circuit further comprises a fourth half-bridge comprising a fourth high-side transistor and a fourth low-side transistor electrically coupled at a fourth node that is electrically coupled to the second coil, wherein the controller is configured to drive the third high-side transistor and the third low-side transistor in a complementary manner, wherein the controller is configured to drive the fourth high-side transistor and the fourth low-side transistor in a complementary manner, wherein the controller is configured to drive the first high-side transistor, the second high-side transistor, the third high-side transistor, and the fourth high-side transistor with the same duty cycle that is different than 50%, wherein the controller is configured to drive the fourth high-side transistor with a second phase shift relative to the third high-side transistor, the second phase shift being equal to the first phase shift, wherein the controller is configured to drive the first half-bridge, the second half-bridge, the third half-bridge, and the fourth half-bridge in order to drive the voltage differential across the energy transfer inductor to zero and maintain the voltage differential across the energy transfer inductor at zero for the predetermined interval causing the inductor current to be clipped at the reduced current level, and wherein the controller is configured to turn on the first high-side transistor or turn on the first low-side transistor when the inductor current is equal to or substantially equal to the reduced current level.

Aspect 21: The dual active bridge circuit of Aspect 20, wherein the controller is configured to drive the first low-side transistor, the second low-side transistor, the third low-side transistor, and the fourth low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or wherein the controller is configured to drive the first high-side transistor, the second high-side transistor, the third high-side transistor, and the fourth high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

Aspect 22: The dual active bridge circuit of Aspect 20, wherein the controller is configured to drive the third high-side transistor 180° out-of-phase with respect to the first high-side transistor.

Aspect 23: The dual active bridge circuit of Aspect 20, wherein the primary side circuit further comprises a fifth half-bridge comprising a fifth high-side transistor and a fifth low-side transistor electrically coupled at a fifth node that is electrically coupled to the energy transfer inductor, wherein the secondary side circuit further comprises a sixth half-bridge comprising a sixth high-side transistor and a sixth low-side transistor electrically coupled at a sixth node that is electrically coupled to the second coil, wherein the controller is configured to drive the fifth high-side transistor and the fifth low-side transistor in a complementary manner, wherein the controller is configured to drive the sixth high-side transistor and the sixth low-side transistor in a complementary manner, wherein the controller is configured to drive the first high-side transistor, the second high-side transistor, the third high-side transistor, the fourth high-side transistor, the fifth high-side transistor, and the sixth high-side transistor with the same duty cycle that is different than 50%, wherein the controller is configured to drive the sixth high-side transistor with a third phase shift relative to the fifth high-side transistor, the third phase shift being equal to the first phase shift, wherein the controller is configured to drive the first half-bridge, the second half-bridge, the third half-bridge, the fourth half-bridge, the fifth half-bridge, and the sixth half-bridge in order to drive the voltage differential across the energy transfer inductor to zero and maintain the voltage differential across the energy transfer inductor at zero for the predetermined interval causing the inductor current to be clipped at the reduced current level, and wherein the controller is configured to turn on the first high-side transistor when the inductor current is equal to or substantially equal to the reduced current level.

Aspect 24: The dual active bridge circuit of Aspect 23, wherein the controller is configured to drive the first low-side transistor, the second low-side transistor, the third low-side transistor, the fourth low-side transistor, the fifth low-side transistor, and the sixth low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or wherein the controller is configured to drive the first high-side transistor, the second high-side transistor, the third high-side transistor, the fourth high-side transistor, the fifth high-side transistor, and the sixth high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

Aspect 25: The dual active bridge circuit of Aspect 23, wherein the controller is configured to drive the first high-side transistor, the third high-side transistor, and the fifth high-side transistor with equidistant phase shifts relative to each other.

Aspect 26: The dual active bridge circuit of any of Aspects 18-25, wherein the transformer has a transformer turn ratio, and wherein the input voltage is less than a product of the output voltage and the transformer turn ratio.

Aspect 27: A method of driving a dual active bridge circuit comprising a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; and a transformer configured to transfer energy from the primary side circuit to the secondary side circuit based on the inductor current, the method comprising: driving each of the first high-side transistor, the first low-side transistor, the second high-side transistor, and the second low-side transistor between respective switching states with a same duty cycle to control the voltage differential across the energy transfer inductor; driving the first high-side transistor 180° out-of-phase with respect to the first low-side transistor; and driving the second high-side transistor 180° out-of-phase with respect to the second low-side transistor, wherein the same duty cycle is less than 50% such that the first high-side transistor, the first low-side transistor, the second high-side transistor, and the second low-side transistor are simultaneously off for a predetermined interval.

Aspect 28: A method of driving a dual active bridge circuit comprising a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, the method comprising: driving each of the first high-side transistor, the first low-side transistor, the second high-side transistor, and the second low-side transistor between respective switching states to control the voltage differential across the energy transfer inductor; driving the first high-side transistor and the first low-side transistor in a complementary manner; driving the second high-side transistor and the second low-side transistor in a complementary manner; driving the first high-side transistor and the second high-side transistor with a same duty cycle that is different than 50%; driving the second high-side transistor with a first phase shift relative to the first high-side transistor, the first phase shift being different than zero; driving the first half-bridge and the second half-bridge in order to drive the voltage differential across the energy transfer inductor to zero and maintain the voltage differential across the energy transfer inductor at zero for a predetermined interval causing the inductor current to be clipped at a reduced current level; and turning on the first high-side transistor or turning on the first low-side transistor when the inductor current is equal to or substantially equal to the reduced current level.

Aspect 29: A system configured to perform one or more operations recited in one or more of Aspects 1-28.

Aspect 30: An apparatus comprising means for performing one or more operations recited in one or more of Aspects 1-28.

Aspect 31: A non-transitory computer-readable medium storing a set of instructions, the set of instructions comprising one or more instructions that, when executed by a device, cause the device to perform one or more operations recited in one or more of Aspects 1-28.

Aspect 32: A computer program product comprising instructions or code for executing one or more operations recited in one or more of Aspects 1-28.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A dual active bridge circuit, comprising:
   a primary side circuit configured to be coupled to a power source for receiving an input voltage, wherein the primary side circuit comprises:
      a first half-bridge comprising a first high-side transistor and a first low-side transistor electrically coupled at a first node; and
      an energy transfer inductor coupled to the first node and configured to provide an inductor current based on a voltage differential across the energy transfer inductor;
   a secondary side circuit configured to provide an output voltage, wherein the secondary side circuit comprises:
      a second half-bridge comprising a second high-side transistor and a second low-side transistor electrically coupled at a second node;
   a transformer configured to transfer energy from the primary side circuit to the secondary side circuit based on the inductor current, wherein the transformer comprises:
      a first coil electrically coupled to the energy transfer inductor for receiving the inductor current and a second coil electrically coupled to the second node of the second half-bridge, wherein the first coil is magnetically coupled to the second coil; and
   a controller configured to drive each of the first high-side transistor, the first low-side transistor, the second high-side transistor, and the second low-side transistor between respective switching states with a same duty cycle to control the voltage differential across the energy transfer inductor,
   wherein the controller is configured to drive the first high-side transistor 180° out-of-phase with respect to the first low-side transistor,
   wherein the controller is configured to drive the second high-side transistor 180° out-of-phase with respect to the second low-side transistor
   wherein the same duty cycle is less than 50% such that the first high-side transistor, the first low-side transistor, the second high-side transistor, and the second low-side transistor are simultaneously off for a predetermined interval.

2. The dual active bridge circuit of claim 1, wherein, during the predetermined interval, the voltage differential across the energy transfer inductor is driven to zero and maintained at zero for a predetermined duration such that the inductor current is reduced.

3. The dual active bridge circuit of claim 2, wherein, during the predetermined interval, the inductor current is driven toward zero for the predetermined duration.

4. The dual active bridge circuit of claim 2, wherein, during the predetermined interval, the inductor current is driven to zero or substantially zero for the predetermined duration.

5. The dual active bridge circuit of claim 2, wherein, during the predetermined duration, the inductor current is maintained substantially stable.

6. The dual active bridge circuit of claim 1, wherein the first high-side transistor, the first low-side transistor, the second high-side transistor, and the second low-side transistor are simultaneously off for the predetermined interval such that:
   a load current of the second high-side transistor is reduced for each turn-on of the second high-side transistor and a load current of the second low-side transistor is reduced for each turn-on of the second low-side transistor.

7. The dual active bridge circuit of claim 1, wherein the first high-side transistor, the first low-side transistor, the second high-side transistor, and the second low-side transistor are simultaneously off for the predetermined interval such that:
   a load current of the second high-side transistor is zero or substantially zero at each turn-on of the second high-side transistor and a load current of the second low-side transistor is zero or substantially zero at each turn-on of the second low-side transistor.

8. The dual active bridge circuit of claim 1, wherein the first high-side transistor, the first low-side transistor, the second high-side transistor, and the second low-side transistor are simultaneously off for the predetermined interval such that:
   a switching loss of the second high-side transistor is substantially zero during each turn-on of the second high-side transistor.

9. The dual active bridge circuit of claim 1, wherein the first high-side transistor, the first low-side transistor, the second high-side transistor, and the second low-side transistor are simultaneously off for the predetermined interval such that:
   a conduction loss of the second high-side transistor is reduced and a conduction loss of the second low-side transistor is reduced.

10. The dual active bridge circuit of claim 1, wherein the controller is configured to drive the first high-side transistor, the first low-side transistor, the second high-side transistor, and the second low-side transistor in a discontinuous conduction mode.

11. The dual active bridge circuit of claim 1, wherein the transformer has a transformer turn ratio, and
   wherein the input voltage is greater than a product of the output voltage and the transformer turn ratio.

12. The dual active bridge circuit of claim 1, wherein the primary side circuit further comprises a third half-bridge comprising a third high-side transistor and a third low-side transistor electrically coupled at a third node that is electrically coupled to the energy transfer inductor,
wherein the secondary side circuit further comprises a fourth half-bridge comprising a fourth high-side transistor and a fourth low-side transistor electrically coupled at a fourth node that is electrically coupled to the second coil,
wherein the controller is configured to drive each of the first high-side transistor, the first low-side transistor, the second high-side transistor, the second low-side transistor, the third high-side transistor, the third low-side transistor, the fourth high-side transistor, and the fourth low-side transistor between respective switching states with the same duty cycle to control the voltage differential across the energy transfer inductor,
wherein the controller is configured to drive the third high-side transistor 180° out-of-phase with respect to the third low-side transistor,
wherein the controller is configured to drive the fourth high-side transistor 180° out-of-phase with respect to the fourth low-side transistor,
wherein the same duty cycle is less than 50% such that the first high-side transistor, the first low-side transistor, the second high-side transistor, the second low-side transistor, the third high-side transistor, the third low-side transistor, the fourth high-side transistor, and the fourth low-side transistor are simultaneously off for the predetermined interval.

13. The dual active bridge circuit of claim 12, wherein, during the predetermined interval, the voltage differential across the energy transfer inductor is driven to zero and maintained at zero for a predetermined duration such that the inductor current is reduced.

14. The dual active bridge circuit of claim 12, wherein the controller is configured to drive the third high-side transistor 180° out-of-phase with respect to the first high-side transistor.

15. The dual active bridge circuit of claim 12, wherein the primary side circuit further comprises a fifth half-bridge comprising a fifth high-side transistor and a fifth low-side transistor electrically coupled at a fifth node that is electrically coupled to the energy transfer inductor,
wherein the secondary side circuit further comprises a sixth half-bridge comprising a sixth high-side transistor and a sixth low-side transistor electrically coupled at a sixth node that is electrically coupled to the second coil,
wherein the controller is configured to drive each of the first high-side transistor, the first low-side transistor, the second high-side transistor, the second low-side transistor, the third high-side transistor, the third low-side transistor, the fourth high-side transistor, the fourth low-side transistor, the fifth high-side transistor, the fifth low-side transistor, the sixth high-side transistor, and the sixth low-side transistor between respective switching states with the same duty cycle to control the voltage differential across the energy transfer inductor,
wherein the controller is configured to drive the fifth high-side transistor 180° out-of-phase with respect to the fifth low-side transistor,
wherein the controller is configured to drive the sixth high-side transistor 180° out-of-phase with respect to the sixth low-side transistor,
wherein the same duty cycle is less than 50% such that the first high-side transistor, the first low-side transistor, the second high-side transistor, the second low-side transistor are simultaneously off for a first predetermined interval; the third high-side transistor, the third low-side transistor, the fourth high-side transistor, the fourth low-side transistor are simultaneously off for a second predetermined interval; and the fifth high-side transistor, the fifth low-side transistor, the sixth high-side transistor, and the sixth low-side transistor are simultaneously off for a third predetermined interval.

16. The dual active bridge circuit of claim 15, wherein, during the first predetermined interval, the voltage differential across the energy transfer inductor is driven to zero and maintained at zero for a predetermined duration such that the inductor current is reduced.

17. The dual active bridge circuit of claim 15, wherein the controller is configured to drive the first high-side transistor, the third high-side transistor, and the fifth high-side transistor with equidistant phase shifts relative to each other.

18. A dual active bridge circuit, comprising:
a primary side circuit configured to be coupled to a power source for receiving an input voltage, wherein the primary side circuit comprises:
a first half-bridge comprising a first high-side transistor and a first low-side transistor electrically coupled at a first node; and
an energy transfer inductor coupled to the first node and configured to provide an inductor current based on a voltage differential across the energy transfer inductor;
a secondary side circuit configured to provide an output voltage, wherein the secondary side circuit comprises:
a second half-bridge comprising a second high-side transistor and a second low-side transistor electrically coupled at a second node;
a transformer configured to transfer energy from the primary side circuit to the secondary side circuit based on the inductor current, wherein the transformer comprises:
a first coil electrically coupled to the energy transfer inductor for receiving the inductor current and a second coil electrically coupled to the second node of the second half-bridge, wherein the first coil is magnetically coupled to the second coil; and
a controller configured to drive each of the first high-side transistor, the first low-side transistor, the second high-side transistor, and the second low-side transistor between respective switching states to control the voltage differential across the energy transfer inductor,
wherein the controller is configured to drive the first high-side transistor and the first low-side transistor in a complementary manner,
wherein the controller is configured to drive the second high-side transistor and the second low-side transistor in a complementary manner,
wherein the controller is configured to drive the first high-side transistor and the second high-side transistor with a same duty cycle that is different than 50%,
wherein the controller is configured to drive the second high-side transistor with a first phase shift relative to the first high-side transistor, the first phase shift being different than zero,
wherein the controller is configured to drive the first half-bridge and the second half-bridge in order to drive the voltage differential across the energy transfer inductor to zero and maintain the voltage differential across the energy transfer inductor at zero for a predetermined interval causing the inductor current to be clipped at a reduced current level, and
wherein the controller is configured to turn on the first high-side transistor or turn on the first low-side transistor when the inductor current is equal to or substantially equal to the reduced current level.

19. The dual active bridge circuit of claim 18, wherein the controller is configured to drive the first low-side transistor and the second low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or
  wherein the controller is configured to drive the first high-side transistor and the second high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

20. The dual active bridge circuit of claim 18, wherein the primary side circuit further comprises a third half-bridge comprising a third high-side transistor and a third low-side transistor electrically coupled at a third node that is electrically coupled to the energy transfer inductor,
  wherein the secondary side circuit further comprises a fourth half-bridge comprising a fourth high-side transistor and a fourth low-side transistor electrically coupled at a fourth node that is electrically coupled to the second coil,
  wherein the controller is configured to drive the third high-side transistor and the third low-side transistor in a complementary manner,
  wherein the controller is configured to drive the fourth high-side transistor and the fourth low-side transistor in a complementary manner,
  wherein the controller is configured to drive the first high-side transistor, the second high-side transistor, the third high-side transistor, and the fourth high-side transistor with the same duty cycle that is different than 50%,
  wherein the controller is configured to drive the fourth high-side transistor with a second phase shift relative to the third high-side transistor, the second phase shift being equal to the first phase shift,
  wherein the controller is configured to drive the first half-bridge, the second half-bridge, the third half-bridge, and the fourth half-bridge in order to drive the voltage differential across the energy transfer inductor to zero and maintain the voltage differential across the energy transfer inductor at zero for the predetermined interval causing the inductor current to be clipped at the reduced current level, and
  wherein the controller is configured to turn on the first high-side transistor or turn on the first low-side transistor when the inductor current is equal to or substantially equal to the reduced current level.

21. The dual active bridge circuit of claim 20, wherein the controller is configured to drive the first low-side transistor, the second low-side transistor, the third low-side transistor, and the fourth low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or
  wherein the controller is configured to drive the first high-side transistor, the second high-side transistor, the third high-side transistor, and the fourth high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

22. The dual active bridge circuit of claim 20, wherein the controller is configured to drive the third high-side transistor 180° out-of-phase with respect to the first high-side transistor.

23. The dual active bridge circuit of claim 20, wherein the primary side circuit further comprises a fifth half-bridge comprising a fifth high-side transistor and a fifth low-side transistor electrically coupled at a fifth node that is electrically coupled to the energy transfer inductor,
  wherein the secondary side circuit further comprises a sixth half-bridge comprising a sixth high-side transistor and a sixth low-side transistor electrically coupled at a sixth node that is electrically coupled to the second coil,
  wherein the controller is configured to drive the fifth high-side transistor and the fifth low-side transistor in a complementary manner,
  wherein the controller is configured to drive the sixth high-side transistor and the sixth low-side transistor in a complementary manner,
  wherein the controller is configured to drive the first high-side transistor, the second high-side transistor, the third high-side transistor, the fourth high-side transistor, the fifth high-side transistor, and the sixth high-side transistor with the same duty cycle that is different than 50%,
  wherein the controller is configured to drive the sixth high-side transistor with a third phase shift relative to the fifth high-side transistor, the third phase shift being equal to the first phase shift,
  wherein the controller is configured to drive the first half-bridge, the second half-bridge, the third half-bridge, the fourth half-bridge, the fifth half-bridge, and the sixth half-bridge in order to drive the voltage differential across the energy transfer inductor to zero and maintain the voltage differential across the energy transfer inductor at zero for the predetermined interval causing the inductor current to be clipped at the reduced current level, and
  wherein the controller is configured to turn on the first high-side transistor when the inductor current is equal to or substantially equal to the reduced current level.

24. The dual active bridge circuit of claim 23, wherein the controller is configured to drive the first low-side transistor, the second low-side transistor, the third low-side transistor, the fourth low-side transistor, the fifth low-side transistor, and the sixth low-side transistor to be on simultaneously in order to drive the voltage differential across the energy transfer inductor to zero and maintain the voltage differential across the energy transfer inductor at zero for the predetermined interval causing the inductor current to be clipped at the reduced current level, or
  wherein the controller is configured to drive the first high-side transistor, the second high-side transistor, the third high-side transistor, the fourth high-side transistor, the fifth high-side transistor, and the sixth high-side transistor to be on simultaneously in order to drive the voltage differential across the energy transfer inductor to zero and maintain the voltage differential across the energy transfer inductor at zero for the predetermined interval causing the inductor current to be clipped at the reduced current level.

25. The dual active bridge circuit of claim 23, wherein the controller is configured to drive the first high-side transistor, the third high-side transistor, and the fifth high-side transistor with equidistant phase shifts relative to each other.

26. The dual active bridge circuit of claim 18, wherein the transformer has a transformer turn ratio, and
wherein the input voltage is less than a product of the output voltage and the transformer turn ratio.

27. A method of driving a dual active bridge circuit comprising a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; and a transformer configured to transfer energy from the primary side circuit to the secondary side circuit based on the inductor current, the method comprising:
driving each of the first high-side transistor, the first low-side transistor, the second high-side transistor, and the second low-side transistor between respective switching states with a same duty cycle to control the voltage differential across the energy transfer inductor;
driving the first high-side transistor 180° out-of-phase with respect to the first low-side transistor; and
driving the second high-side transistor 180° out-of-phase with respect to the second low-side transistor,
wherein the same duty cycle is less than 50% such that the first high-side transistor, the first low-side transistor, the second high-side transistor, and the second low-side transistor are simultaneously off for a predetermined interval.

28. A method of driving a dual active bridge circuit comprising a primary side circuit configured to be coupled to a power source for receiving an input voltage, wherein the primary side circuit comprises: a first half-bridge comprising a first high-side transistor and a first low-side transistor electrically coupled at a first node; and an energy transfer inductor coupled to the first node and configured to provide an inductor current based on a voltage differential across the energy transfer inductor; a secondary side circuit configured to provide an output voltage, wherein the secondary side circuit comprises: a second half-bridge comprising a second high-side transistor and a second low-side transistor electrically coupled at a second node; a transformer configured to transfer energy from the primary side circuit to the secondary side circuit based on the inductor current, the method comprising:
driving each of the first high-side transistor, the first low-side transistor, the second high-side transistor, and the second low-side transistor between respective switching states to control the voltage differential across the energy transfer inductor;
driving the first high-side transistor and the first low-side transistor in a complementary manner;
driving the second high-side transistor and the second low-side transistor in a complementary manner;
driving the first high-side transistor and the second high-side transistor with a same duty cycle that is different than 50%;
driving the second high-side transistor with a first phase shift relative to the first high-side transistor, the first phase shift being different than zero;
driving the first half-bridge and the second half-bridge in order to drive the voltage differential across the energy transfer inductor to zero and maintain the voltage differential across the energy transfer inductor at zero for a predetermined interval causing the inductor current to be clipped at a reduced current level; and
turning on the first high-side transistor or turning on the first low-side transistor when the inductor current is equal to or substantially equal to the reduced current level.

\* \* \* \* \*